US011893190B2

(12) United States Patent
Nietfeld

(10) Patent No.: US 11,893,190 B2
(45) Date of Patent: Feb. 6, 2024

(54) CLUSTER-BASED SENSOR ASSIGNMENT

(71) Applicant: Valve Corporation, Bellevue, WA (US)

(72) Inventor: Scott Douglas Nietfeld, Bellevue, WA (US)

(73) Assignee: VALVE CORPORATION, Bellevue, WA (US)

( * ) Notice: Subject to any disclaimer, the term of this patent is extended or adjusted under 35 U.S.C. 154(b) by 16 days.

(21) Appl. No.: 17/342,126

(22) Filed: Jun. 8, 2021

(65) Prior Publication Data

US 2021/0294444 A1    Sep. 23, 2021

Related U.S. Application Data

(63) Continuation of application No. 16/442,299, filed on Jun. 14, 2019, now Pat. No. 11,042,247.

(51) Int. Cl.
*G06F 3/044* (2006.01)
*G06F 3/0354* (2013.01)
(Continued)

(52) U.S. Cl.
CPC ............ *G06F 3/044* (2013.01); *A63F 13/214* (2014.09); *G06F 3/03547* (2013.01);
(Continued)

(58) Field of Classification Search
CPC ...... G06F 3/014; G06F 3/04186; G06F 3/017; G06F 3/03547; G06F 18/23213;
(Continued)

(56) References Cited

U.S. PATENT DOCUMENTS 6,570,078 B2    5/2003    Ludwig
8,754,746 B2    6/2014    Lukas et al.
(Continued)

OTHER PUBLICATIONS

SlagCoin Instruction Manual for a Joystick Controller "SlagCoin Appendix—Joystick Controller" last updated Feb. 25, 2009 www.slagcoin.com/joystick.html 52 pages.
(Continued)

*Primary Examiner* — Wing H Chow
(74) *Attorney, Agent, or Firm* — Lee & Hayes P.C.

(57) ABSTRACT

The logic of a handheld controller system may use a clustering algorithm to determine which sensors of a touch sensor array, such as capacitive pads, to assign to individual fingers of a user's hand. The clustering algorithm disclosed herein allows for dynamically determining the controller configuration on-the-fly for a given user. An example process includes receiving data generated by a plurality of sensors of a touch sensor array of the handheld controller, generating a covariance matrix that indicates correlations between pairs of sensors, determining a plurality of feature vectors based at least in part on the covariance matrix, each feature vector corresponding to an individual sensor and describing that sensor's correlation(s) with one or more other sensors, clustering the feature vectors using a clustering algorithm, and configuring the touch sensor array according to a controller configuration that assigns sensors to respective fingers of a hand.

20 Claims, 15 Drawing Sheets

(51) Int. Cl.
    *G06F 17/16*     (2006.01)
    *A63F 13/214*     (2014.01)
    *G06F 18/23213*     (2023.01)

(52) U.S. Cl.
    CPC ........ G06F 17/16 (2013.01); G06F 18/23213 (2023.01); *A63F 2300/1068* (2013.01)

(58) Field of Classification Search
    CPC ........ G06F 3/0488; G06F 17/16; G06F 3/044; A63F 13/214; A63F 13/67; A63F 13/24; A63F 13/42
    See application file for complete search history.

(56) References Cited

U.S. PATENT DOCUMENTS

| | | | |
|---|---|---|---|
| 9,950,256 | B2 | 4/2018 | Lim |
| 10,427,035 | B2 | 10/2019 | Schmitz et al. |
| 10,441,881 | B2 | 10/2019 | Burgess et al. |
| 2006/0111180 | A1 | 5/2006 | Cheng |
| 2006/0278715 | A1* | 12/2006 | Hamilton .............. G06F 3/0238 235/472.01 |
| 2008/0261695 | A1 | 10/2008 | Coe |
| 2009/0205878 | A1 | 8/2009 | Taylor |
| 2015/0293695 | A1* | 10/2015 | Schönleben .......... G06F 3/0412 345/173 |
| 2015/0324116 | A1* | 11/2015 | Marsden ............. G06F 3/04886 345/158 |
| 2016/0361638 | A1 | 12/2016 | Higgins |
| 2017/0189800 | A1 | 7/2017 | Crain |
| 2019/0108447 | A1 | 4/2019 | Kounavis |
| 2019/0155439 | A1 | 5/2019 | Mukherjee |
| 2020/0393922 | A1 | 12/2020 | Nietfeld |

OTHER PUBLICATIONS

WICO Corporation Consumer Division Manual for "WICO Command Control" Trackball controller, 1982, 6 pages.

International Report on Preliminary Patentability for PCT Application No. PCT/US20/37496, dated Dec. 23, 2021.

Garbade, "Understanding K-means Clustering in Machine Learning", retrieved on Apr. 10, 2020 at <<https://towardsdatascience.com/understanding-k-means-clustering-in-machine-learning-6a6e67336aa1>>, Sep. 12, 2018.

Non Final Office Action dated Apr. 15, 2020 for U.S. Appl. No. 16/442,299 "Cluster-Based Sensor Assignment", Nietfeld, 18 pages.

PCT Search Report and Written Opinion dated Jul. 20, 2020 for PCT Application No. PCT/US2020/037496, 10 pages.

Extended European Search Report dated Jan. 4, 2023 for European Patent Application No. 20822349.5, 8 pages.

\* cited by examiner

CONTROLLER CONFIGURATION
1000

CLUSTER-BASED SENSOR ASSIGNMENT

CROSS REFERENCE TO RELATED APPLICATION

This U.S. patent application is a continuation of and claims priority to co-pending and commonly assigned U.S. patent application Ser. No. 16/442,299, entitled "CLUSTER-BASED SENSOR ASSIGNMENT," and filed on Jun. 14, 2019, the entirety of which is incorporated herein by reference.

BACKGROUND

Handheld controllers are used in an array of architectures for providing input, for example, to a remote computing device. For instance, handheld controllers are utilized in the gaming industry to allow players to interact with a personal computing device executing a gaming application, a game console, a game server, and/or the like. Handheld controllers may find use in virtual reality (VR) environments and may mimic natural interactions such as grasping, throwing, squeezing, etc., as much as possible. While current handheld controllers provide a range of functionality, further technical improvements may enhance systems that utilize handheld controllers.

DETAILED DESCRIPTION

Figure 1:
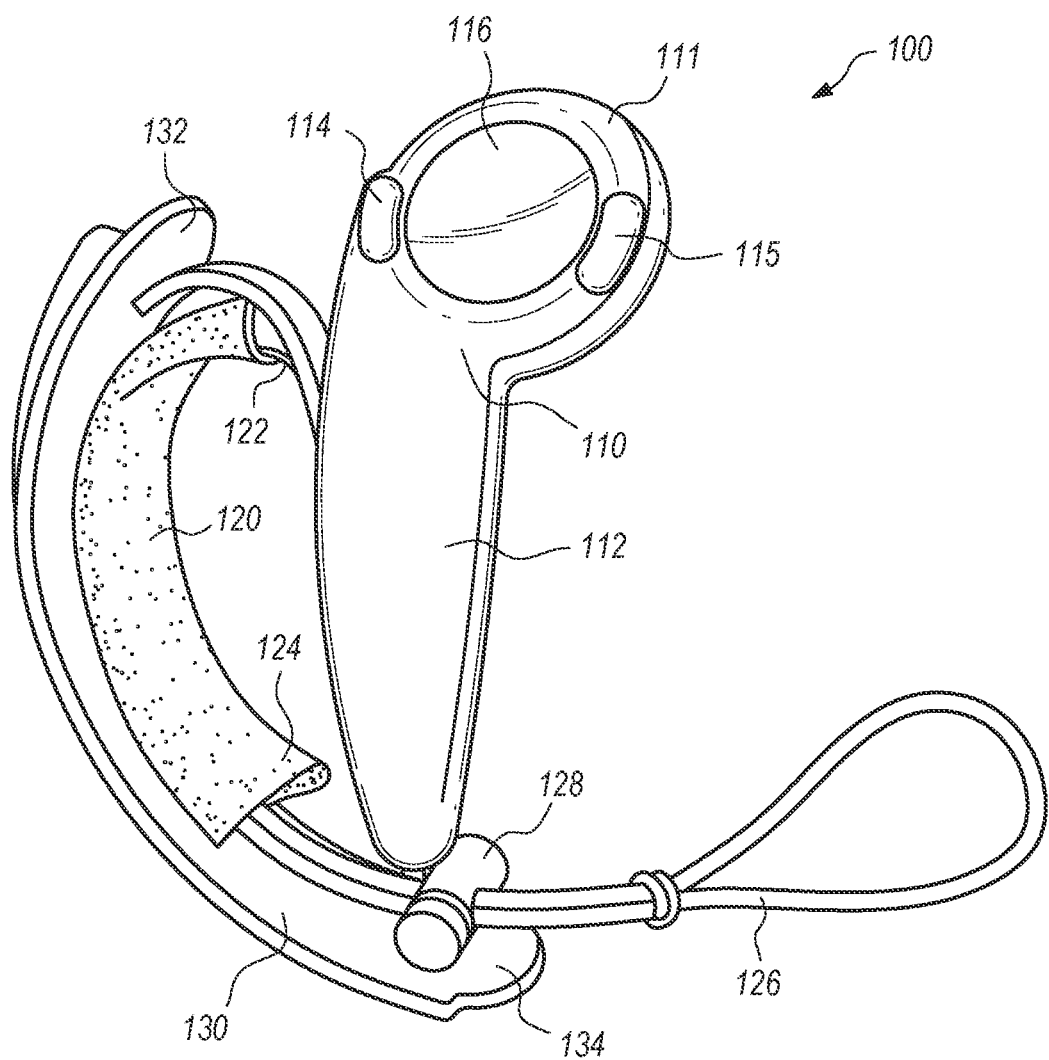
FIG. 1 depicts a controller according to an example embodiment of the present disclosure, with a hand retainer in an open position.

Described herein are, among other things, handheld controllers having touch-sensitive controls, methods for using outputs of the touch-sensitive controls, and methods for dynamically adjusting the touch-sensitive controls based on a hand size and/or grip of a user operating the handheld controller and using a clustering algorithm to dynamically assign certain sensors to certain fingers. In some instances, the handheld controller described herein may control a remote device (e.g., a television, audio system, personal computing device, game console, etc.), to engage in video game play, and/or the like.

The handheld controller may include one or more controls such as one or more joysticks, trackpads, trackballs, buttons, or other controls that are controllable by the user operating the handheld controller. Additionally, or alternatively, the handheld controller may include one or more controls that include a touch sensor (sometimes referred to herein as a "touch sensor array") configured to detect a presence, proximity, location, and/or gesture of the user on respective controls of the handheld controller. The touch sensor may comprise a capacitive touch sensor, a force resistive touch sensor, an infrared touch sensor, a touch sensor that utilizes acoustic soundwaves to detect a presence or location of an object, a proximity of an object, and/or any other type of sensor configured to detect touch input at the handheld controller or a proximity of one or more objects relative to the handheld controller. Additionally, in some instances, the touch sensor may comprise capacitive pads.

The touch sensor communicatively couples to one or more processors of a handheld controller (or a handheld controller system including the handheld controller) to send touch sensor data indicative of touch input at the one or more processors. The touch sensor data may also indicate a closeness or proximity of one or more fingers relative to the handheld controller. The touch sensor data may indicate a location of the touch input on the handheld controller and/or may indicate a location of the fingers relative to the handheld controller, potentially as they change over time. For instance, if the fingers of the user hover or are disposed away from the handheld controller, the touch sensor data may indicate how extended or close the fingers are with respect to the handheld controller.

The handheld controller (or a handheld controller system including the handheld controller) may also include logic (e.g., software, hardware, and/or firmware, etc.) that is configured to receive the touch sensor data and determine the presence of a finger of the user and/or a location (or "position") of the finger(s) on the handheld controller(s). For example, in instances where the touch sensor comprises the capacitive pads, different regions or groups of capacitive pads may represent or correspond to different fingers of the user and the logic may determine which region(s) and/or group(s) of capacitive pads detect a capacitance. This data may be provided to a game or other application for performing one or more actions at the handheld controller, such as a gesture performed by finger(s) touching or in close proximity to the handheld controller. For instance, the touch sensor data or other indications may be transmitted to an application executing on a gaming console, a remote system, other handheld controller(s), or other computing devices, such as a head-mounted displays (HMD). The application may utilize the touch sensor data and/or indications to perform one or more actions, such as generating image data (e.g., a virtual representation) corresponding to a hand of the user and its position and/or orientation, which may be a gesture, in some instances.

The logic of the handheld controller (or a computing device communicatively coupled to the handheld controller) may use a clustering algorithm to determine which sensors of the touch sensor array, such as capacitive pads, to assign to individual fingers of the user's hand. This sensor-to-finger mapping that assigns subsets of the sensors to individual fingers of a hand is sometimes referred to herein as a "controller configuration." The clustering algorithm disclosed herein allows for dynamically determining the controller configuration on-the-fly for a given user. Cluster analysis is concerned with receiving a set of samples as input, each sample being described by a set of values (e.g., a multi-dimensional feature vector), and using a cluster analysis algorithm to classify the samples into different groups. For instance, if a computing device is tasked with classifying flowers into multiple different species (groups), each flower in the sample set can be described by a set of values (e.g., a feature vector) that include values for: (i) a number of petals, (ii) a color, (iii) an average diameter, (iv) a height, etc. In this example, a clustering algorithm can analyze the sets of values that describe the sample set, and determine how those sets of values are distributed and correlated with each other among the sample set in order to cluster the flowers into different groups. For instance, a clustering algorithm may determine that flowers with five petals tend to be white and tend to have a first average diameter and height, while flowers with three petals tend to be yellow and tend to have a second average diameter and height. Based on these determinations, the samples (in this case, flowers) can be classified into different groups, such as groups that represent a unique species of flower.

In applying cluster analysis to the disclosed touch sensor array of the handheld controller, the plurality of sensors (e.g., capacitive pads) of the touch sensor array may represent a sample set including samples that are to be classified into one of multiple different groups. At least some of these groups may correspond to a respective finger(s) of a hand (e.g., a pinky finger, a ring finger, a middle finger, and possibly an index finger). In some embodiments, the multiple different groups may further include a "non-finger" group in which untouched, or seldom touched, sensors can be clustered.

In an illustrative example, as a user grips the handle of the controller in different ways (e.g., by grasping the handle, extending a finger(s) away from the handle, etc.) over time, the touch sensor array of the handheld controller generates data, such as capacitance values. A history of data generated by the touch sensor array can be maintained for a period of time. The logic of the handheld controller (or a computing device communicatively coupled to the handheld controller) may process the touch sensor data to generate a covariance matrix, such as a n×d covariance matrix for a set of n sensors of the touch sensor array. This covariance matrix describes, or indicates, correlations between pairs of sensors. In other words, the covariance matrix indicates which sensors (e.g., capacitive pads) vary with each other over time, and, conversely, which sensors do not vary with each other over time. In some embodiments, in order to generate the covariance matrix, the logic may calculate statistics based on the history of data generated by the touch sensor array, such as calculating average capacitance values over the last p samples detected by individual sensors (e.g., capacitive pads). The logic may use the calculated statistics to determine covariance values (e.g., a value within a range of negative one to positive one [−1,+1]) that indicate the degree of correlation between pairs of sensors, and may populate the covariance matrix with these covariance values. The n×d matrix may be initially built and continuously updated with these covariance values.

Notably, generating a n×d covariance matrix for a set of n sensors, where d<n, allows for generating a covariance matrix with fewer positions than the number of positions that would be populated in a n×n covariance matrix. This allows for conserving computing resources because it is less expensive, from a computational standpoint, to generate a n×d covariance matrix than it is to generate a n×n covariance matrix, where d<n. It is to be appreciated, however, that d may be equivalent to n, in some embodiments. Furthermore, because the sample set to be clustered corresponds to an array of sensors that are substantially horizontally-striated across the handle of the controller, generating a n×d covariance matrix, where d<n, provides sufficient data to accurately cluster feature vectors that describe the sensors (e.g., capacitive pads). In other words, it can be assumed, if the user is holding the controller with the correct hand (e.g., holding a left-handed controller with the left hand, as opposed to holding the left-handed controller with the right hand) in the correct manner (e.g., with fingers oriented substantially horizontally on the handle of the controller), that certain sensors are highly likely to be positively correlated with each other. For instance, when the controller is held with the correct hand, in the correct manner, two adjacent sensors that are in the same horizontal row and closest to the palm of the hand are highly likely to be positively correlated with each other because a single finger is highly likely to cover both sensors when the handle is grasped, as opposed to the single finger touching one but not the other of the adjacent sensors. Accordingly, it is to be appreciated that it may be wasteful, from a computational standpoint, to evaluate whether certain pairs of sensors are positively correlated if it is highly likely that they will be positively correlated. Instead, only a subset possible permutations of sensors pairs may be evaluated for a positive correlation between those pairs of sensors using a n×d covariance matrix, where d<n. Moreover, because the covariance matrix is symmetric with respect to the principal diagonal of the covariance matrix, the logic of the handheld controller (or a handheld controller system including the handheld controller) need not calculate values of the covariance matrix on both sides of the principal diagonal. That is, the logic may calculate values of the covariance matrix on one side of the principal diagonal, and duplicate, or replicate, those values on the other side of the principal diagonal to create the symmetric covariance matrix, thereby conserving computing resources by avoiding calculation of values on one side of the principal diagonal.

Each sensor (e.g., capacitive pad) of the touch sensor array can be described by a d-dimensional feature vector (where d is a positive integer that is less than or equal to n) having a set of values that are each indicative of a degree of correlation between the sensor and another sensor in the touch sensor array. In an illustrative example, the touch sensor array may include n=32 sensors (e.g., capacitive pads). This array of 32 sensors may be distributed across the handle of the controller for tracking the user's fingers on the handle. A subset of reference sensors, such as a subset of d=5 reference sensors, can be selected, or otherwise used, to generate a 32×5 covariance matrix, in an illustrative example. Thus, in this example, each sensor is described by a five-dimensional (5D) feature vector, resulting in 32 5D feature vectors. In this example, a 5D feature vector for the $i^{th}$ sensor may describe the $i^{th}$ sensor's degrees of correlation with a set of five sensors among the 32 sensors. It is to be appreciated that the number "n" may represent any positive integer. n=32 is merely an example of a number of sensors (e.g., capacitive pads) that may constitute the touch sensor array.

A clustering algorithm, such as a k-means clustering algorithm, may process the respective sets of values of the d-dimensional feature vectors that describe individual sensors of the set of n sensors to cluster the feature vectors by determining which ones are positively correlated with each other. In this manner, the sensors of the touch sensor array that are described by the clustered feature vectors can be assigned to different groups that make up a controller configuration. At least some of these groups may be associated with respective fingers of the hand (e.g., a pinky finger, a ring finger, a middle finger, and possibly an index finger). For example, in a given controller configuration, a first subset of the n sensors may be assigned to a first group that corresponds to a first finger of the hand (e.g., the middle finger), a second subset of the n sensors may be assigned to a second group that corresponds to a second finger of the hand (e.g., the ring finger). In some cases, a third subset of the n sensors may be assigned to a third group that corresponds to a third finger (e.g., the pinky finger). As mentioned, in some cases, a fourth subset of the n sensors may be assigned to a fourth group that is not associated with any finger (this group being referred to herein as a "non-finger" group). A non-finger group may be utilized if, for example, it is expected that a subset of the n sensors will never, or seldom, be touched while the user is holding/using the handheld controller.

The disclosed cluster-based sensor assignment approach is more flexible and versatile, as compared to traditional approaches for assigning sensors of a touch sensor array to fingers of a hand. This is at least because, in the disclosed cluster-based sensor assignment approach, there is no preconceived notion of controller configurations that map sensors to fingers, and the controller configurations are therefore not limited to a predefined set of configurations. Rather, the controller configurations that map sensors to fingers are determined on-the-fly using a clustering algorithm. This is an improvement over traditional approaches where static controller configurations are used, or where a controller configuration is selected from a limited set of predefined controller configurations. Both of these traditional approaches may end up utilizing controller configurations which are suboptimal for a given user's grip. Furthermore, using the disclosed cluster-based sensor assignment approach also means that the logic is less dependent upon the particular arrangement of the sensors (e.g., capacitive pads) in the touch sensor array. That is, the disclosed cluster-based sensor assignment logic works well with varying arrangements and/or distributions of sensors on the handle of the controller. This may translate into a lower cost of manufacturing the handheld controller because less design work is necessary for arranging the sensors of the touch sensor array on the handle, and/or it may be utilized across a wide range of controller designs.

When the touch sensor array is configured according to a controller configuration based on the clustering described above, and when data from the touch sensor array is subsequently received, the logic of the handheld controller (or a computer communicatively coupled to the handheld controller) may associate the data generated by the touch sensor array with corresponding fingers of the user, which may in turn be utilized by (e.g., input to) an application to render a virtual hand on a display and/or identify a hand gesture. In other words, knowing which sensor(s) (e.g., capacitive pad(s)) correspond to respective fingers of the hand (sometimes referred to as "finger tracking") allows the logic to determine a corresponding hand gesture of the user, such as when fingers grip the handheld controller and/or which fingers do not grip the handheld controller. For instance, the logic may determine the user grips the handheld controller with the middle finger and the ring finger, but not the pinky finger. As such, knowing which sensor(s), or group of sensor(s) correspond to the respective fingers of the hand, the logic may provide an indication of this gesture to an application configured to perform a predefined action associated with the gesture or generate image data corresponding to the hand, and, in some cases, a gesture (e.g., middle finger and ring finger grip an object, while the pinky finger does not grip the object). Moreover, through utilizing touch sensor data associated with a proximity of the fingers relative to the handheld controller, such as detected capacitance values, the logic of the handheld controller may determine an amount of curl or extension associated with each finger (e.g., how far the fingers are disposed away from handheld controller).

The handheld controller may dynamically adjust, detect, and accommodate for varying grips of the user or different users that operate the handheld controller. For instance, the grip of the user may change depending on how the user holds the handheld controller, what game the user plays, and/or physical features of the hand of the user (e.g., length of finger, width of finger, etc.). The touch sensor array may therefore adapt to different grips of the user by using the clustering algorithm to dynamically update the controller configuration at runtime to one that best fits the user's grip. This may include instances where the user holds the handheld controller differently, and the touch sensor array may adapt to the grip of users by reconfiguring the touch sensor array according to an updated controller configuration. In other words, even for different users with similar hands, or as a user progresses throughout gameplay, the grip of the user may change (e.g., the fingers of the user may grip different parts of handheld controller). To accommodate for the varying grips and to enhance a gameplay experience, the logic may remap or re-associate the sensors (e.g., capacitive pads) of the touch sensor array according to different, dynamically-determined controller configurations. In doing so, the logic of the controller may associate the touch sensor data with certain fingers of the user to accurately portray a virtual hand on a display and/or a hand gesture of the user.

The handheld controller may also sense, detect, or measure, via the touch sensor array and/or a pressure sensor, an amount of force associated with touch input at the handheld controller. For instance, as a finger of a user presses against the handheld controller, a portion of the controller, such as a cover disposed above the touch sensor array and/or the pressure sensor, may deflect to contact the touch sensor and/or the pressure sensor. The pressure sensor may couple to the one or more processors such that touch input of the finger may result in force data being provided to the one or more processors. The pressure sensor may provide force data indicative of an amount of force of the touch input to the one or more processors. In some instances, the pressure sensor may comprise a force-sensing resistor (FSR) sensor, a piezoelectric sensor, a load cell, a strain gauge, a capacitive-type pressure sensor that measures capacitive force measurements, or any other type of pressure sensor. Additionally, in some instances, the touch sensor data and/or the force data may be interpreted together and associated with a predefined command (e.g., squeezing).

While traditional handheld controllers may include sensors to sense touch input, many traditional controllers statically map the touch sensor to certain fingers. Such mapping, however, does not reassign portions of the touch sensor array, such as the capacitive pads, to certain fingers or dynamically adapt the touch sensor array to different fingers depending on the grip of the user. This static mapping may lead to a user experience within a gameplay environment that is less than ideal. For instance, if the touch sensor data does not accurately map to a respective finger of the user, the generated hand image may not accurately depict the hand of the user operating the handheld controller. Other traditional handheld controllers, while capable of dynamically switching controller configurations, are limited to a set of predefined configurations that are used in an attempt to accommodate a user's grip as best as possible using the predefined controller configurations. However, these predefined controller configurations not be optimized for the unique grips of certain users. The techniques and systems described herein improve upon the traditional handheld controllers by using a clustering algorithm to dynamically determine which sensors (e.g., capacitive pads) of the touch sensor array are to be assigned to certain fingers of the user's hand. In doing so, there are many more possible configurations that map sensors (e.g., capacitive pads) to fingers in different ways, making for a much more flexible and versatile finger tracking approach. This, in turn, can enable image data generated from touch sensor data to more accurately depict the fingers of the user, which may enrich gameplay experience and/or other applications being controlled by the handheld controller.

FIG. 1 is a front view of an example controller 100 that may include one or more touch-sensitive controls. As will be discussed herein, the touch-sensitive controls may generate touch sensor data utilized by the controller 100 and/or other computing devices to generate hand gestures of the user. The touch sensor data may indicate a presence, location, closeness, and/or gesture of a finger(s) of a user operating the controller 100. In some instances, the controller 100 may be utilized by an electronic system such as a VR video gaming system, robot, weapon, or medical device.

As illustrated, the controller 100 may include a controller body 110 having a handle 112, and a hand retainer 120. The controller body 110 may include a head disposed between the handle 112 and a distal end 111 of the controller 100, which may include one or more thumb-operated controls 114, 115, 116. For example, a thumb-operated control may include a tilting button, or any other button, knob, wheel, joystick, or trackball conveniently manipulated by a thumb of a user during normal operation when the controller 100 is held in the hand of the user.

The handle 112 may include a substantially cylindrical tubular housing. In this context, a substantially cylindrical shape need not have constant diameter, or a perfectly circular cross-section.

Figure 6:
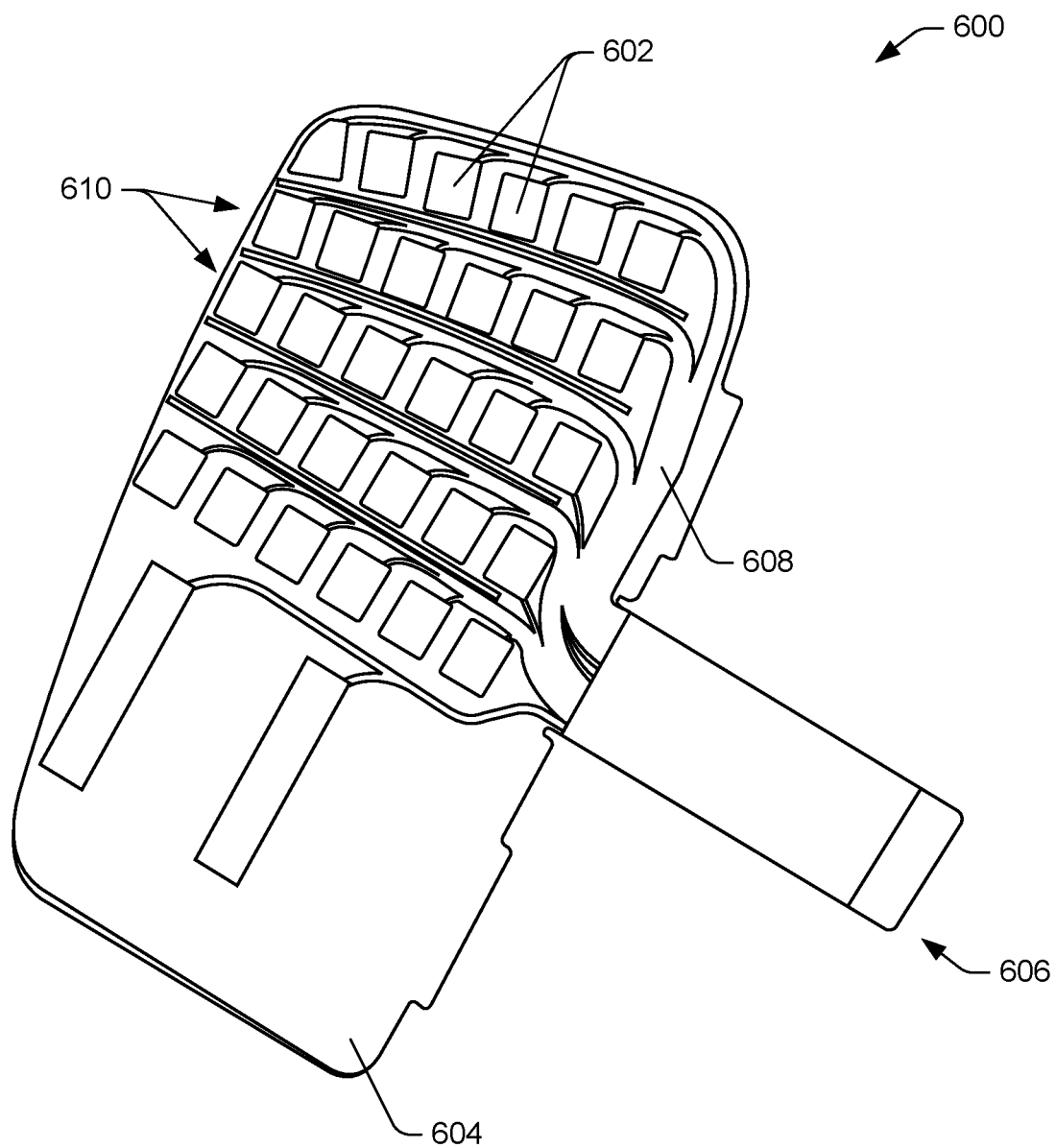
FIG. 6 depicts a touch sensor (or touch sensor array) of the controller of FIG. 1, according to an example embodiment of the present disclosure.

The handle 112 may include a proximity sensor and/or a touch sensor (sometimes referred to herein as a "touch sensor array") having a plurality of sensors, such as capacitive pads, spatially distributed partially or completely on (e.g., around a surface of), or otherwise spread about, the handle 112. An example of this touch sensor array is depicted in FIG. 6. In an example, the sensors (e.g., capacitive pads) may be spatially distributed beneath the outer surface of the handle 112 and/or may be embedded under the outer surface of the handle 112. The sensors (e.g., capacitive pads) may be responsive to a user touching, gripping, or grasping the handle 112 to identify the presence, position, and/or gestures of one or more fingers of the user. Additionally, the sensors (e.g., capacitive pads) may be responsive to one or more fingers hovering or being disposed above the handle 112. For instance, one or more fingers of the user may not grasp or wrap around the controller 100 but instead, may be displaced above the outer surface of the handle 112. To accommodate such and detect a proximity of the fingers and/or touch input, the outer surface of the handle 112 may comprise an electrically insulative material.

The hand retainer 120 may couple to the controller 100 to bias the palm of the hand of the user against the outside surface of the handle 112. As shown in FIG. 1, the hand retainer 120 is in the open position. The hand retainer 120 may optionally bias in the open position by a curved resilient member 122 to facilitate the insertion of the hand of the user between the hand retainer 120 and the controller body 110 when the user grasps the controller 100. For example, the curved resilient member 122 may include a flexible metal strip that elastically bends, or may comprise an alternative plastic material such as nylon, that may bend substantially elastically. A fabric material 124 (e.g., a sheath made of cloth, neoprene, or any suitable material), may partially or completely cover the curved resilient member 122 to cushion or increase a comfort of the user. Alternatively, the cushion or fabric material 124 may adhere to only the side of the curved resilient member 122 facing the hand of the user.

The hand retainer 120 may adjust in length, for example, by including a draw cord 126 that is cinched by a spring-biased chock 128. The draw cord 126 may optionally have an excess length for use as a lanyard. In some examples, the cushion or fabric material 124 may attach to the draw cord 126. In addition, the curved resilient member 122 may be preloaded by the tension of the cinched draw cord 126 and in such embodiments, the tension that the curved resilient member 122 imparts to the hand retainer 120 (to bias it in the open position) may cause the hand retainer 120 to automatically open when the draw cord 126 is un-cinched. However, alternative conventional ways to adjust the length of a hand retainer 120, such as a cleat, an elastic band (that temporarily stretches when the hand is inserted, so that it applies elastic tension to press against the back of the hand), a hook & loop strap attachment that allows length adjustment, etc. may be used.

The hand retainer 120 may be disposed between the handle 112 and a tracking member 130, and may contact the back of the hand of the user. The tracking member 130 may affix to the controller body 110 and may optionally include two noses 132, 134, where each nose may protrude from a corresponding one of two opposing distal ends of the tracking member 130. In some instances, the tracking member 130 may include an arc having a substantially arcuate shape. In some instances, the tracking member 130 may include tracking transducers (e.g., sensors or beacons, such as infrared (IR) light sensors or IR light beacons) disposed therein, for example, with at least one tracking transducer disposed in each protruding nose 132, 134. The controller body 110 may include additional tracking transducers, such as a tracking transducer disposed adjacent the distal end 111.

The controller 100 may include a rechargeable battery disposed within the controller body 110, and the hand retainer 120 may include an electrically-conductive charging wire electrically coupled to the rechargeable battery. The controller 100 may also include a radio frequency (RF) transmitter for communication with the rest of an electronic system (e.g., a gaming console, which may be a component of the handheld controller system). The rechargeable battery may power the RF transmitter and the data transmitted via the RF transmitter may be data generated in response to operations of the thumb-operated controls 114, 115, 116, the touch sensor (e.g., the capacitive sensors) in the handle 112, and/or tracking sensors in the tracking member 130.

In some instances, the controller body 110 may comprise a single piece of injection molded plastic or any other material rigid enough to transfer a force from a finger of the user to the touch sensor and thin enough to allow for capacitive coupling between a finger of the user and the touch sensor. Alternatively, the controller body 110 and the tracking member 130 may be fabricated separately, and then later assembled together.

Figure 2:
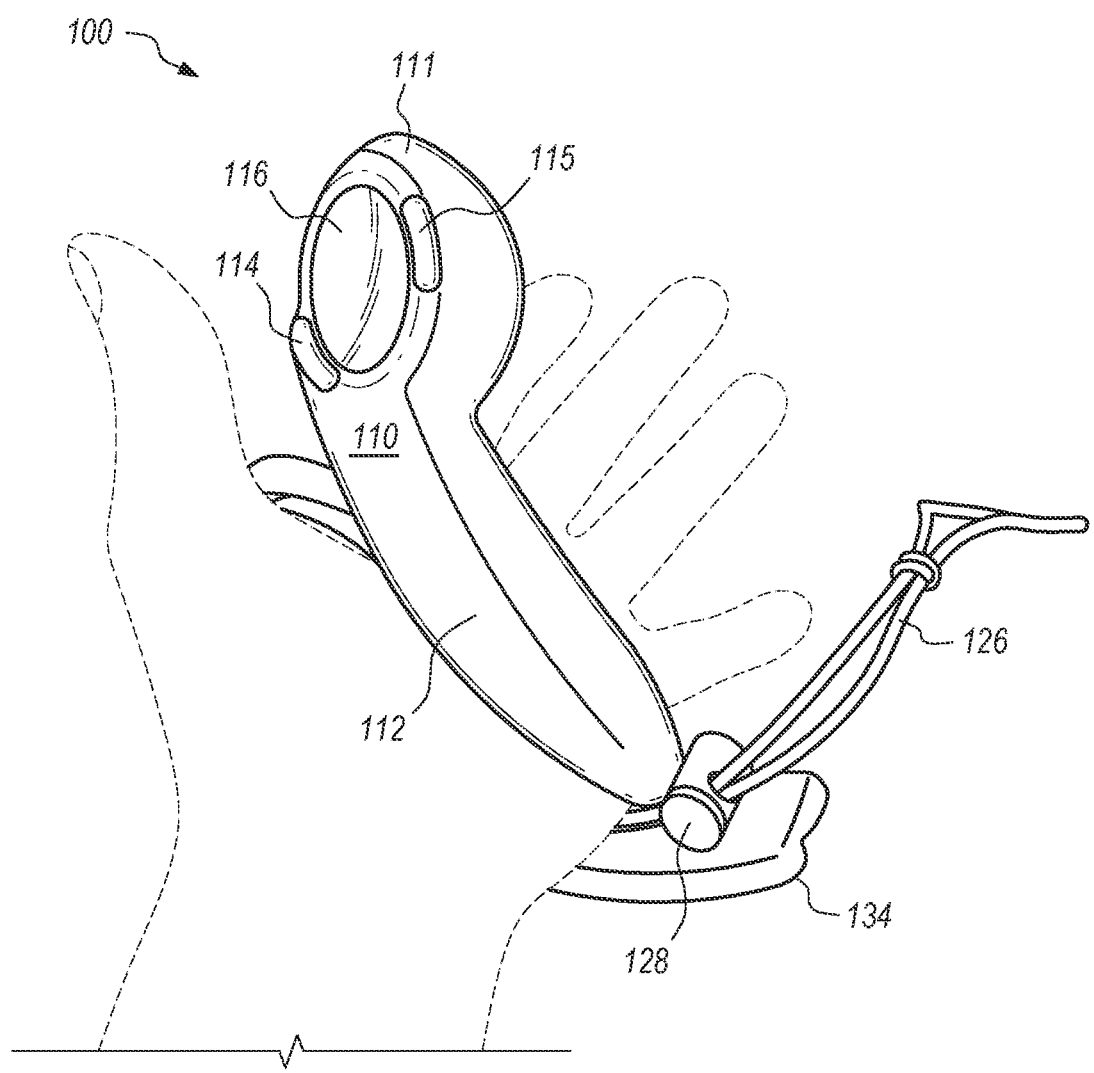
FIG. 2 depicts the controller of FIG. 1 in an open, palm-up, hand of a user according to an example embodiment of the present disclosure.

FIG. 2 is a front view of the controller 100, showing the controller 100 during operation with the left hand of the user inserted therein but not grasping the controller body 110. In FIG. 2, the hand retainer 120 is cinched over the hand of the user to physically bias the palm of the user against the outside surface of the handle 112. Here, the hand retainer 120, when closed, may retain the controller 100 on, or around, the hand of the user even when the hand is not grasping the controller body 110. As shown, when the hand retainer 120 is closed tightly around the hand of the user, the hand retainer 120 may prevent the controller 100 from falling out of hand of the user. Hence, in some embodiments, the hand retainer 120 may allow the user to "let go" of the controller 100 without the controller 100 actually separating from the hand, being thrown, and/or dropped to the floor, which may enable additional functionality. For example, if the release and restoration of the user grasping the handle 112 of the controller body 110 is sensed, the release or grasping may be incorporated into the game to display throwing or grasping objects (e.g., in VR environment). The hand retainer 120 may allow such a function to be accomplished repeatedly and safely. The hand retainer 120 may also prevent fingers of the user from excessively translating relative to the touch sensor array distributed about the handle 112 to more reliably sense finger motion and/or placement on the handle 112.

Figure 3:
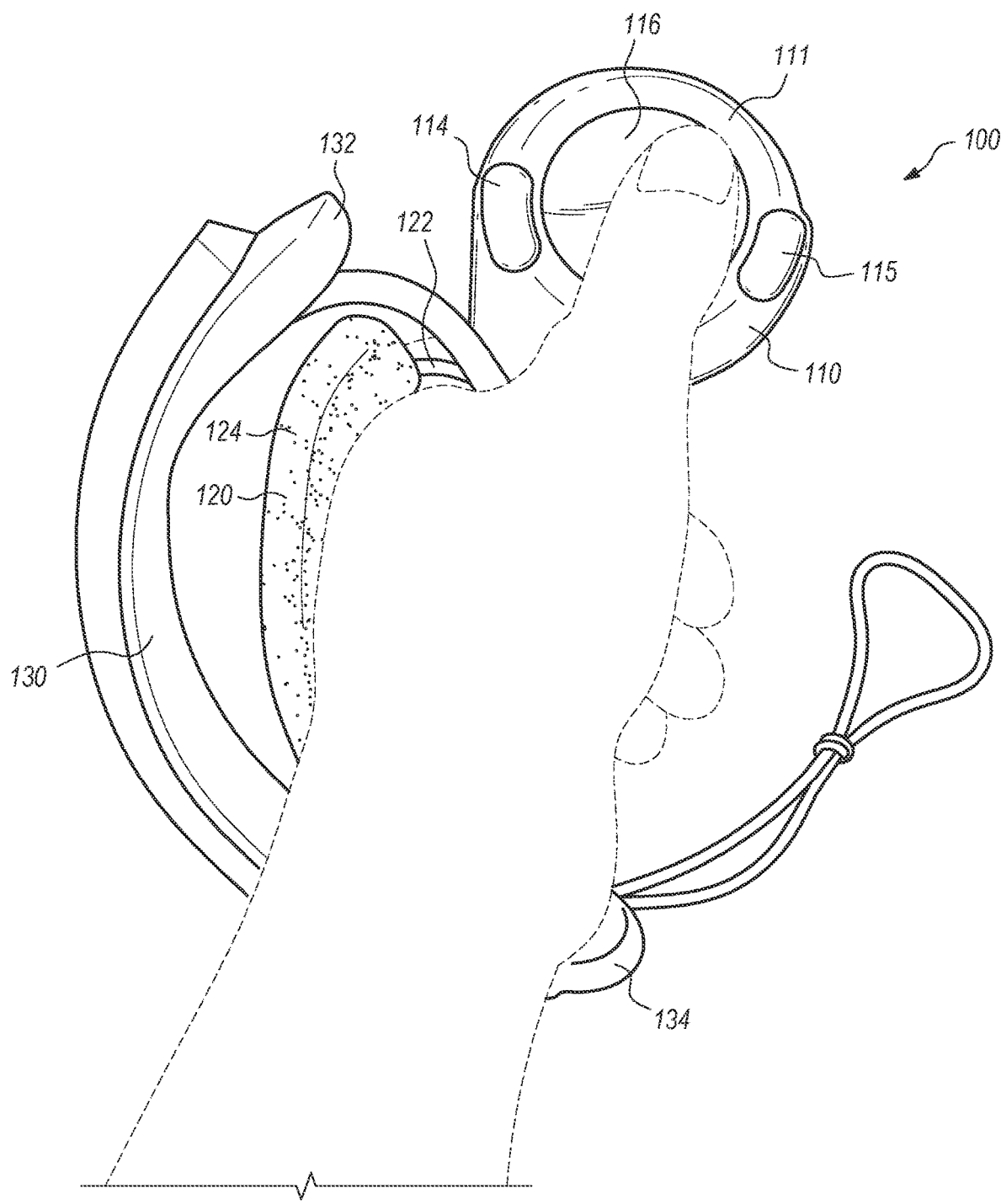
FIG. 3 depicts the controller of FIG. 1 in a closed hand of the user according to an example embodiment of the present disclosure.
Figure 4:
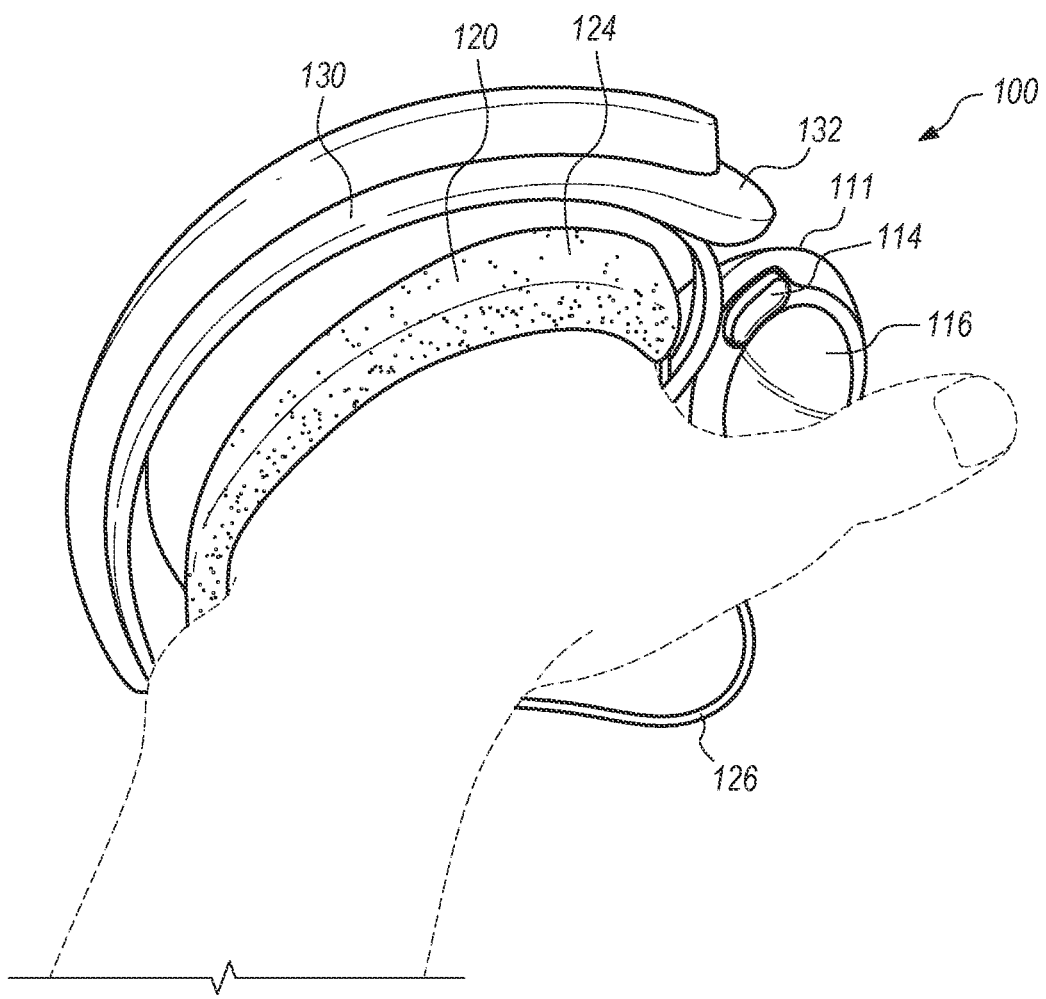
FIG. 4 depicts the controller of FIG. 1 in closed, palm-down, hand of the user according to an example embodiment of the present disclosure.

FIGS. 3 and 4 depict the controller 100 during operation when the hand retainer 120 is cinched while the hand of the user grasps the controller body 110. As shown in FIGS. 3 and 4, the thumb of the user may operate one or more of the thumb-operated controls 114, 115, 116.

Figure 5:
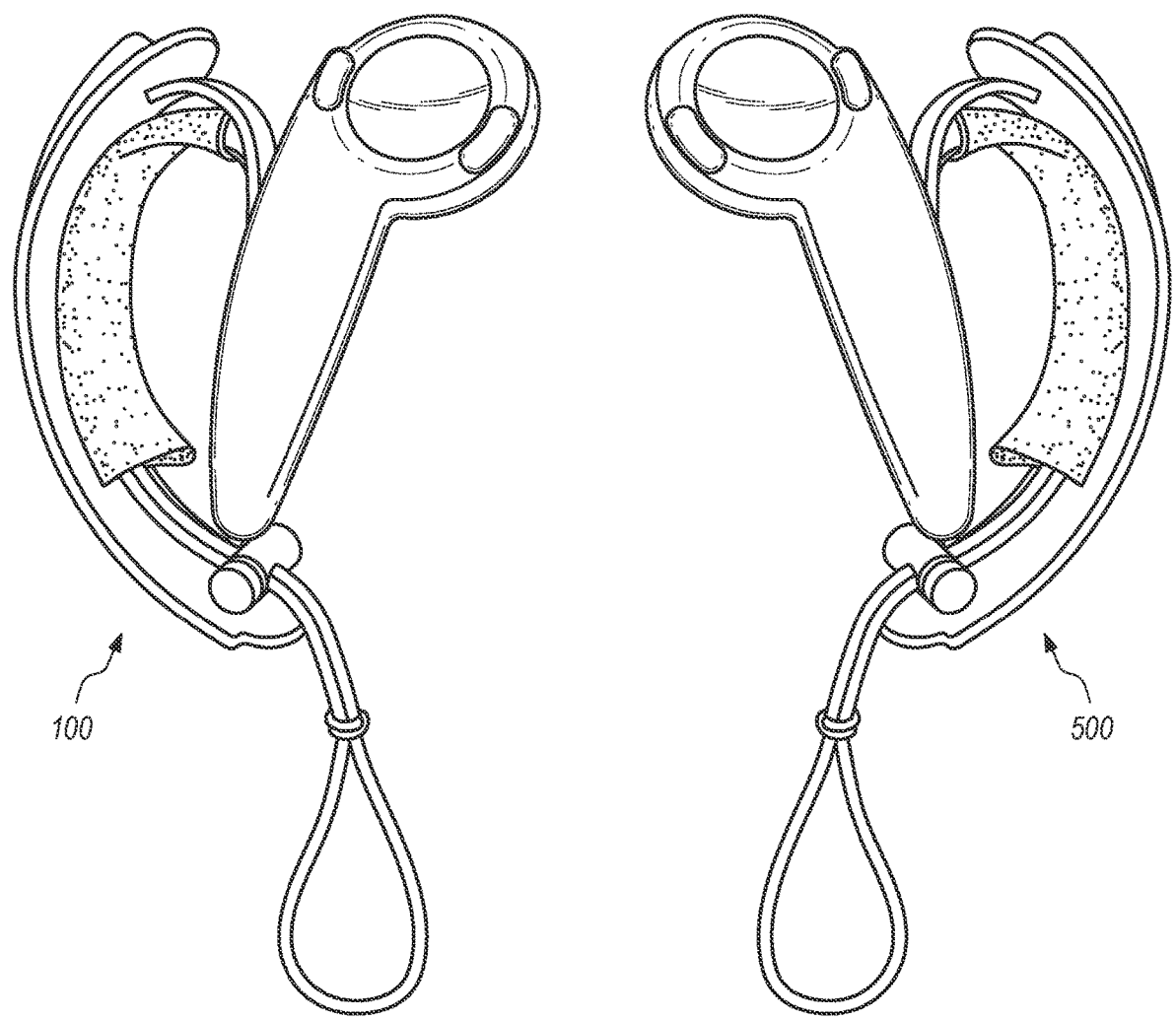
FIG. 5 depicts a pair of controllers according to an example embodiment of the present disclosure, with hand retainers in an open position.

FIG. 5 illustrates that in certain embodiments, the controller 100 may be the left controller in a pair of controllers that includes a similar right controller 500. In certain embodiments, the controller 500 may be the right controller in a pair of controllers that includes a similar left controller 100. In certain embodiments, the controllers 100 and 500 may (together) track the motion and grip of both of the hands of the user, simultaneously, for example, to enhance a VR experience. It is to be appreciated that reference numeral 100, when used throughout this disclosure may be replaced with reference numeral 500 to describe either the left or right controller shown in FIG. 5, without changing the basic characteristics of the disclosure.

FIG. 6 illustrates a proximity sensor or a touch sensor 600 (sometimes referred to herein as a "touch sensor array 600") having a plurality of sensors 602 (e.g., capacitive pads 602) configured to detect touch input on a controller (e.g., the controller 100) as well as a proximity of one or more objects (e.g., finger) relative to the controller 100. In some embodiments, the touch sensor 600 may additionally or alternatively include different types of sensors than capacitive pads, which are configured to detect touch input at the controller 100 or a proximity of a finger(s) relative to the controller 100, such as an infrared or acoustic sensor(s). It is to be appreciated that references herein to "capacitive pads 602" may be replaced with "sensors 602", where appropriate, to describe the touch sensor array 600 with respect to any suitable type of sensor technology. As shown in FIG. 6, the capacitive pads 602 of the touch sensor 600 are arranged in an array, but the capacitive pads 602 are not necessarily of equal size and do not necessarily have substantially equal spacing therebetween. However, in some embodiments, the capacitive pads 602 may comprise a grid, with substantially equally spacing therebetween, and of substantially equal size.

The touch sensor 600 may include a flexible printed circuit assembly (FPCA) 604 on which the capacitive pads 602 are disposed. The FPCA 604 may include a connector 606 for connecting to a printed circuit board (PCB) of the controller 100 that includes one or more processors. The capacitive pads 602 may communicatively connect to the connector 606 via traces 608 disposed on the FPCA 604. The capacitive pads 602 may provide touch sensor data (e.g., capacitance value) to the one or more processors of the controller 100 (or of a handheld controller system that includes the controller 100) via the traces 608 and the connector 606. As discussed in more detail herein, the touch sensor data may indicate the proximity of the finger relative to the controller 100. That is, the touch sensor 600 may measure the capacitance of individual capacitive pads 602, where the capacitance may be associated with a proximity of the fingers relative to the controller 100 (e.g., touching or being disposed above the handle 112 of the controller 100).

The touch sensor 600 may couple to an interior surface within the controller body 110, such as a structure mounted within the handle 112 of the controller body 110, or a structure mounted underneath the handle 112 of the controller body 110. In doing so, touch sensor 600 may be disposed beneath the outer surface of the handle 112 and configured to detect a proximity of the fingers relative to the handle 112 by virtue of the sensors 602 being distributed about the handle 112. When coupled to the controller 100, the touch sensor 600 may angularly span around a circumference or a portion of the handle 112. For instance, the FPCA 604 may couple (e.g., adhesion) to the inner surface of the controller body 110 at the handle 112 to detect the proximity of the fingers relative to the handle 112. In some embodiments, the touch sensor 600 may extend at least 100 degrees but not more than 170 degrees around the circumference of the handle 112. Additionally, or alternatively the touch sensor 600 may couple to the outer surface of the controller 110, such as an outer surface of the handle 112.

The capacitive pads 602 may be spaced apart from one another to detect a proximity of different fingers relative to the controller 100, or different portions of the finger(s) of the user (e.g., fingertip). For instance, as shown in FIG. 6, the capacitive pads 602 are arranged into rows, columns, a grid, sets, subsets, or groups 610. As will be described in more detail below, when a clustering algorithm is used to cluster feature vectors that describe the individual capacitive pads 602, subsets of the capacitive pads 602 may end up being assigned to a particular finger of the user (e.g., a middle finger, a ring finger, a pinky finger, and possibly an index finger) in accordance with a dynamically-determined controller configuration.

As shown in FIG. 6, the example touch sensor 600 may include six rows of capacitive pads 602, where the rows extend substantially horizontally across a surface of the FPCA 604. However, in some embodiments, the touch sensor 600 may include more than six rows or less than six rows. These rows are oriented substantially horizontally on the handle 112 when the touch sensor 600 is integrated into the controller 100. Furthermore, the example touch sensor 600 is shown as including six columns of capacitive pads 602, where the columns extend substantially vertically across a surface of the FPCA 604. However, in some embodiments, the touch sensor 600 may include more than six columns or less than six columns. These columns are orientated substantially vertically on the handle 112 when the touch sensor 600 is integrated into the controller 100. The touch sensor 600 may have a set of n sensors 602. The example touch sensor 600 shown in FIG. 6 has a set of n=32 sensors, because not all rows have an equal number of sensors 602.

When certain subsets of sensors 602 are assigned to groups that correspond to fingers of a hand, the controller 100 (or another communicatively coupled computing device) may utilize touch sensor data (e.g., capacitance values) from the sensors 602 to generate image data of a virtual hand, such as hand gestures of the user. That is, the touch sensor 600 may generate touch sensor data for use in detecting a presence, location, and/or gesture of the finger(s) of the user that grip the controller 100. In embodiments that utilize capacitive-type sensors 602, as the user grips the controller 100 with certain fingers and hovers certain fingers above the controller 100, a voltage is applied to the capacitive pads 602 that results in an electrostatic field. Accordingly, when a conductor, such as a finger of a user touches or nears the capacitive pads 602, a change in capacitance occurs. The capacitance may be sensed by connecting an RC oscillator circuit to touch sensor 600 and noting that a time constant (and therefore the period and frequency of oscillation) will vary with the capacitance. In this way, as a user releases finger(s) from the controller 100, grips the controller 100 with certain finger(s), or nears the controller 100, the controller 100 may detect a change in capacitance.

The capacitance values of the capacitive pads 602, or individual capacitive sensors within a grid on each capacitive pad 602, are used to determine the location of the conductor as well as the proximity of the conductor relative to the capacitive pad 602. That is, as a user grips the controller 100, certain fingers and/or portions of the fingers may contact the handle 112 of the controller 100. As the finger(s) act as a conductor, those capacitive pads 602 underlying the handle 112 where the user touches the handle 112 may measure a capacitance value. These capacitance values are measured over time for use in identifying a gesture of the user. However, in instances where the user hovers their fingers or certain portions of their finger away from the controller 100, the capacitance value may represent or be associated with how far the finger is disposed away from the controller 100. The touch sensor data may therefore be utilized to determine the proximity and/or location of the fingers with respect to the controller 100. As the grip of the user may change throughout a gameplay experience, or between different users, it may become beneficial to associate the fingers with different capacitive pads 602 of the touch sensor 600. For example, at a first instance, a user may have a wide grip and all capacitive pads 602 of the touch sensor 600 may detect a capacitance value that can be used in generating image data associated with a virtual hand. In this first instance, certain subsets of the capacitive pads 602 may be assigned to certain fingers of the hand using a clustering algorithm, as described herein. At a second instance, the grip of the user may narrow, and less than all of the capacitive pads 602 of the touch sensor 600 may detect a capacitance value that can be used in generating the image data associated with the virtual hand. In this second instance, because the fingers may touch different capacitive pads 602, as compared to the first instance, different subsets of the capacitive pads 602 may be assigned to the fingers of the hand using the clustering algorithm with the updated touch sensor data. Thus, in order to generate accurate image data depicting the hand (e.g., a hand gesture), the capacitive pads 602 may be dynamically assigned to certain fingers of the hand using the disclosed cluster-based sensor assignment approach. Knowing which capacitive pads 602 of the touch sensor 600 are associated with respective fingers of the hand allows for the generation of a corresponding hand gesture using the capacitance values detected by the touch sensor 600. Therefore, with a changing grip of the user, the capacitive pads 602 may regroup or associate with different fingers such that their capacitance values produce accurate image data depicting a hand gesture.

The one or more processors may include algorithms and/or machine-learning techniques embodying anatomically-possible motions of fingers, to better use the touch sensor data to detect the opening the hand of a user, finger pointing, or other motions of fingers relative to the controller 100 or relative to each other. In this way, the movement of the controller 100 and/or fingers of the user may help control a VR gaming system, defense system, medical system, industrial robot or machine, or another device. In VR applications (e.g. for gaming, training, etc.), the touch sensor data may be utilized to render the release of an object based on the sensed release of the fingers of the user from the outer surface of the handle 112. Additionally, or alternatively, one or more processors of a communicatively coupled computing device (e.g., a host computing device, a game console, etc.) that the controller 100 is interacting with may detect the gesture(s) using the touch data.

In some instances, the capacitive pads 602 may also detect a capacitance value that corresponds to an amount of force applied to an associated portion of the controller 100 (e.g., a force applied to an outer surface of the handle 112, to at least one thumb-operated control 114, 115, 116, etc.). Additionally, or alternatively, the touch sensor 600, or other portions of the controller 100 (e.g., the handle 112), may include a force sensing resistor (FSR), which uses variable resistance to measure an amount of force applied to the FSR. As the controller 100 may be configured to be held by a hand of a user, the FSR may mount on a planar surface of a structure within the controller body 110, such as a structure that is mounted within the handle 112 of the controller body 110, or a structure that is mounted underneath the controller body 110. In certain embodiments, the FSR, in conjunction with the capacitive pads 602, may facilitate sensing of both the onset of grasping by the user, and the relative strength of such grasping by the user, which may be facilitate certain gameplay features. In either instance, the FSR may generate force data for use in detecting a presence, location, and/or gesture of the finger(s) of the user that grasp the controller 100. When implemented in the controller 100, the FSR and/or the capacitive pads 602 may measure a resistance value, or a capacitance value, respectively, that correspond to an amount of force applied to an associated portion of the controller 100.

In some embodiments, the one or more processors of the controller 100 may utilize the touch sensor data and/or the force data to detect a hand size of a hand grasping the handle 112 and/or to adjust the threshold force required for registering a touch input at the capacitive pads 602 and/or the FSR according to the hand size. This may be useful for making force-based input easier for users with smaller hands (and harder, but not difficult, for users with larger hands).

Figure 7:
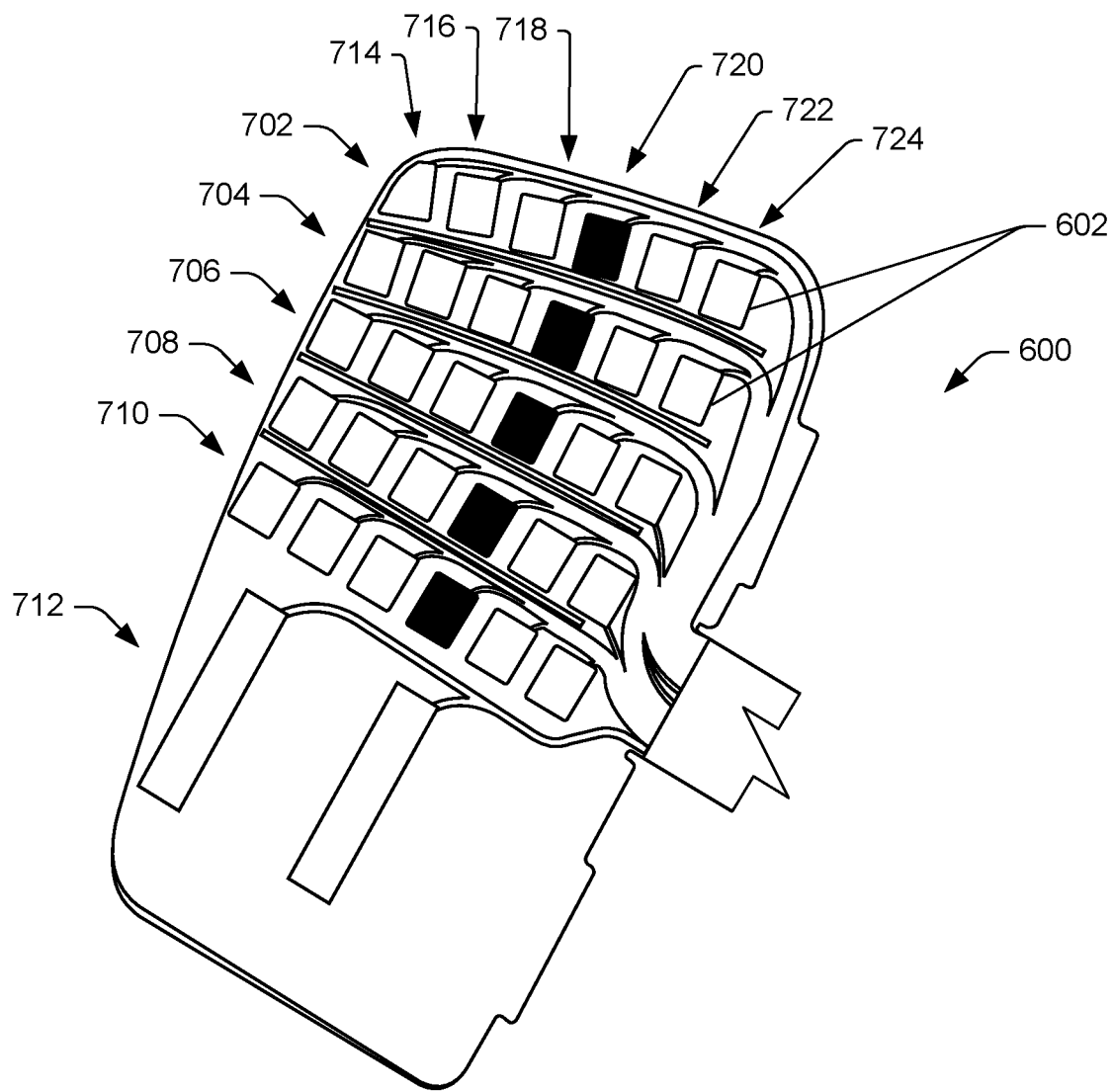
FIG. 7 depicts an example subset of d reference sensors of the touch sensor array of FIG. 6, the subset of reference sensors usable to generate a n×d covariance matrix for a set of n sensors, according to an example embodiment of the present disclosure.

FIG. 7 depicts an example subset of d reference sensors of the touch sensor array 600 of FIG. 6, the subset of reference sensors usable to generate a n×d covariance matrix for a set of n sensors, according to an example embodiment of the present disclosure. That is, in FIG. 7, the "shaded-in" capacitive pads 602 represent subset of d reference sensors. Accordingly, in the example of FIG. 7, d=5, but it is to be appreciated that d can be any integer less than or equal to n, n representing the total number of sensors 602 in the touch sensor array 600. As mentioned, the touch sensor array 600 may include a plurality of sensors 602 (e.g., capacitive pads 602) distributed in rows and columns. For example, the sensors 602 may be distributed in a first row 702, a second row 704, a third row 706, a fourth row 708, a fifth row 710, and a sixth row 712. The sensors 602 may also be distributed in a first column 714, a second column 716, a third column 718, and fourth column 720, a fifth column 722, and a sixth column 724. Again, it is to be appreciated that, although the distribution may be in rows and columns, the sensors 602 are not necessarily of equal size and do not necessarily have substantially equal spacing therebetween. Furthermore, the rows and columns do not have to be in perfect alignment (e.g., the rows and/or columns may have a slight curve, the sensors 602 can be staggered from row-to-row, column-to-column, etc.). In the example of FIG. 7, the subset of d reference pads (i.e., the "shaded-in" pads 602) comprises a column of pads 602, such as the fourth column 720 of pads 602 that is near a middle of the touch sensor array 602. Choosing the reference pads as a column near a middle of the touch sensor array 602 may allow for evaluating correlations between pairs of sensors 602 where the certainty of there being a positive correlation between those sensor pairs is not already known to be highly likely or highly unlikely. This may be based on heuristics or empirical evidence.

Figure 8:
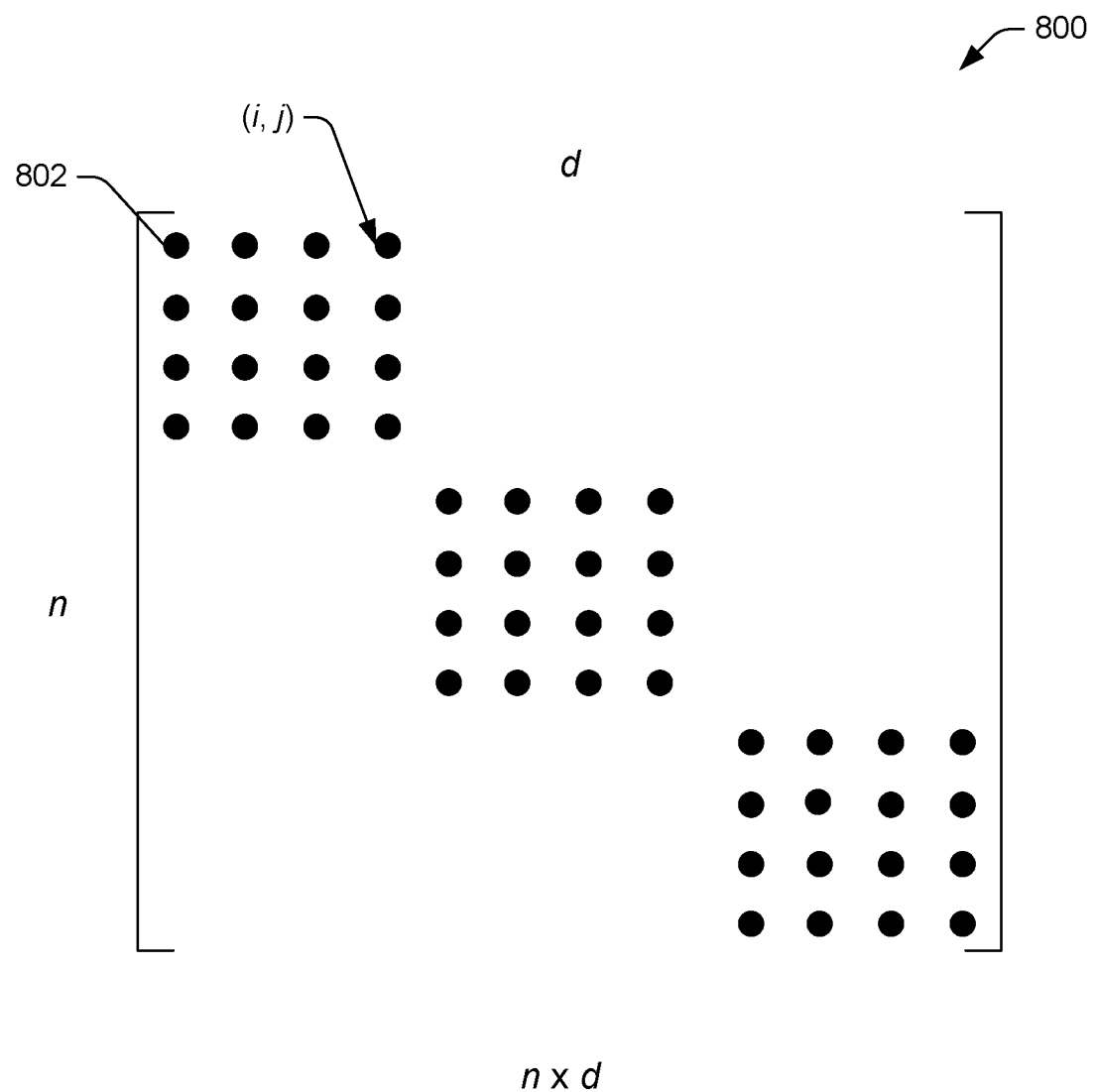
FIG. 8 depicts an example n×d covariance matrix that may be generated based on data generated by the touch sensor array, according to an example embodiment of the present disclosure.

FIG. 8 depicts an example n×d covariance matrix 800 that may be generated based on data generated by the touch sensor array 600, according to an example embodiment of the present disclosure. Over time, as data is generated by the plurality of sensors 602 of the touch sensor array 600, this touch sensor data may be processed to generate a covariance matrix, such as the example n×d covariance matrix 800 shown in FIG. 8, where the number "n" represents the number of sensors 602 in the touch sensor array 600 and "d" represents a set of reference sensors, such as the "shaded-in" sensors 602 shown in FIG. 7. In this example, d<n, but it is to be appreciated that the set of d reference sensors may not be a subset if d=n. In an illustrative example, n=32 and d=5.

In general, the covariance matrix 800 indicates correlations between pairs of sensors 602 of the plurality of sensors 602 of the touch sensor array 600. In some embodiments, in order to generate the covariance matrix 800, logic of the handheld controller 100 (or logic of a handheld controller system that includes the controller 100) may calculate statistics based at least in part on the touch sensor data generated by the touch sensor 600 over a period of time. For example, statistics can be calculated based on the history of data generated by the touch sensor array 600, such as calculating average capacitance values over the last p samples detected by individual sensors (e.g., capacitive pads). The logic may use the calculated statistics to determine covariance values that indicate the degree of correlation between pairs of sensors 602, and then the logic may populate the covariance matrix 800 with these covariance values. The covariance values that are populated in the various positions of the covariance matrix 800 may be values within a range of negative one (−1) to positive one (+1), inclusive, negative one being the least positively correlated, and positive one being the most positively correlated. The covariance values may be values within other possible ranges, such as a range from zero (0) to positive one (+1). Thus, the covariance value that is populated in a given position of the covariance matrix 800 indicates the degree of correlation between a pair of sensors 602 in terms of whether they vary with each other over time. As touch sensor data is continuously generated by the touch sensor array 600, the n×d covariance matrix 800 may be initially built and continuously updated with these covariance values over time. To illustrate, a covariance value at position (i, j) of the covariance matrix 800 may indicate the degree of correlation between $i^{th}$ sensor 602 and the $j^{th}$ sensor 602.

The dots 802 shown in the covariance matrix 800 are to indicate example pairs of sensors 602 that might be positively correlated with each other, according to the covariance value for that pair of sensors 602. For example, if the covariance value in the i, j position of the covariance matrix 800 satisfies a threshold value, the $i^{th}$ sensor 602 may be considered to be positively correlated with the $j^{th}$ sensor 602, and vice versa. As shown by the dots 802 in FIG. 8, the covariance matrix 800 is symmetric with respect to the principal diagonal of the covariance matrix 800, as is the case with every covariance matrix. The logic of the handheld controller 100 (or a handheld controller system including the handheld controller 100) can leverage this property of the covariance matrix 800 by calculating values of the covariance matrix 800 on one side of the principal diagonal, and by duplicating, or replicating, those values on the other side of the principal diagonal to create the symmetric covariance matrix 800, thereby conserving computing resources by avoiding calculation of values on one side of the principal diagonal.

Based at least in part on the covariance matrix 800, logic of the handheld controller 100 (or a handheld controller system that includes the handheld controller 100) may determine a plurality of feature vectors. For a n×d covariance matrix 800, the logic may determine n d-dimensional feature vectors. In an example where n=32, and where d=5, the logic may determine 32 5D feature vectors. Each feature vector may correspond to a sensor 602 of the plurality of sensors 602 of the touch sensor array 600. Furthermore, each feature vector may describe a correlation between the sensor 602 and one or more other sensors 602 of the plurality of sensors 602. Where d=5, this means that a given feature vector describes correlations between a given sensor 602 and a set of five sensors 602 of the touch sensor array 600, which correspond to the set of d reference sensors. Thus, a feature vector that describes the top left sensor 602 in the array may include a first covariance value indicative of the correlation between the top left sensor 602 and a first sensor of the set of d reference sensors (e.g., the "shaded-in" references sensors shown in FIG. 7), a second covariance value indicative of the correlation between the top left sensor 602 and a second sensor of the set of d reference sensors, and so on for any number of d reference sensors. For example, a 5D feature vector for a given sensor 602 may look like the following: [0, 0, 0.5, 0.8, −0.2]. It is to be appreciated that a correlation matrix populated with correlation values can be used in a similar manner to that described herein with respect to a covariance matrix 800 populated with covariance values. In the case of a correlation matrix, the feature vectors may include correlation values instead of covariance values.

With a plurality of feature vectors derived from the covariance matrix 800, a clustering algorithm may be used to cluster the plurality of feature vectors into multiple clusters that are used to assign certain sensors 602 to certain fingers of the hand. Any suitable clustering algorithm can be used. A k-means clustering algorithm is suitable, including standard k-means, weighted k-means, etc. Other types of clustering algorithms besides k-means may additionally or alternatively be utilized to cluster representations of the sensors 602 into groups.

Figure 9:
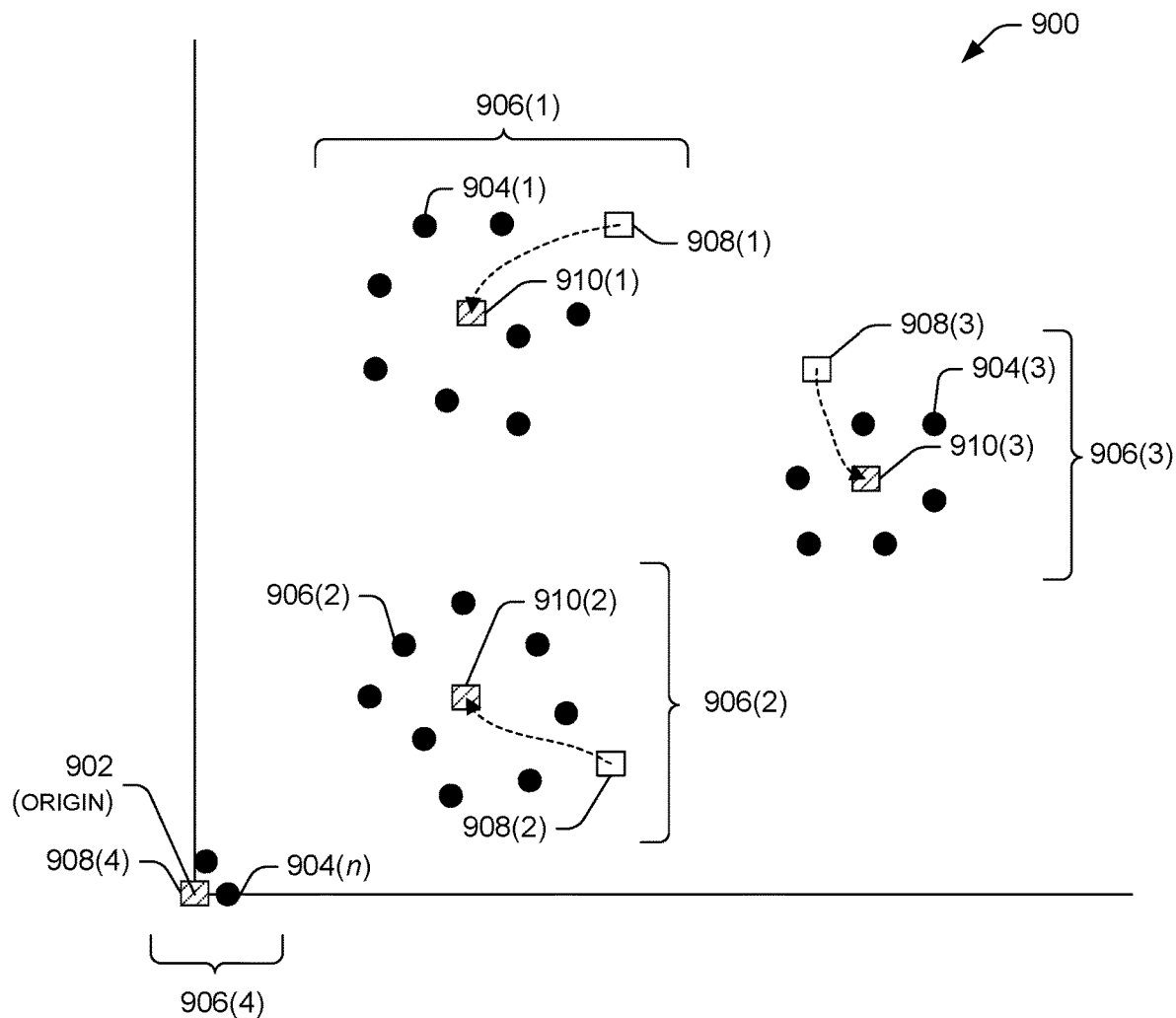
FIG. 9 depicts a spatial dot plot that represents a slice of d-dimensional space, the spatial dot plot illustrating how a clustering algorithm clusters feature vectors that describe sensors of the touch sensor array, according to an example embodiment of the present disclosure.

FIG. 9 depicts a spatial dot plot 900 that may represent a "slice" (e.g., a two-dimensional (2D) slice) of d-dimensional space, the spatial dot plot 900 illustrating how a clustering algorithm, such as a k-means clustering algorithm, clusters feature vectors that describe sensors 602 of the touch sensor array 600, according to an example embodiment of the present disclosure. The spatial dot plot 900 may have a vertical axis and a horizontal axis that intersect at a origin, or zero, point. Data points 904(1), 904(2), 904(3), ..., 904(n) represent the feature vectors derived from the covariance matrix 800. In an illustrative example, a set of n=32 feature vectors may be derived from a nxd covariance matrix 800, where d=5, and the data points 904(1)-(n) in the spatial dot plot 900 may represent those feature vectors, each vector being a 5D feature vector corresponding to an individual sensor 602, and which describes that sensor's 602 respective degrees of correlation with (or the sensor's 602 covariance to) a subset of d=5 reference sensors. One may think of these feature vectors as pointing to positions in space, the same way that humans do with 2D or 3D vectors, but in this case, the feature vectors may be higher-dimensional vectors that can be visualized with a slice of that higher-dimensional space. If one were to plot all of the feature vectors in 5D space (the spatial dot plot 900 representing a slice of this 5D space), subsets of the feature vectors can be clustered together in the 5D space using a clustering algorithm, such as a k-means clustering algorithm, to create clusters 906. Each cluster 906 corresponds to a group that is to be used for finger tracking. For example, a first cluster 906(1) may correspond to a first group associated with a first finger of a hand (e.g., a middle finger), a second cluster 906(2) may correspond to a second group associated with a second finger of the hand (e.g., a ring finger), a third cluster 906(3) may correspond to a third group associated with a third finger of the hand (e.g., a pinky finger), and, in some cases, a fourth cluster 906(4) may correspond to a fourth group that is not associated with any finger (e.g., a non-finger group).

Using a k-means clustering algorithm as an example, the clustering algorithm may be initialized (or seeded) with input parameters that include, without limitation, a number of k clusters 906, and k center estimates 908 that represent initial estimates for the centers of the clusters 906 in d-dimensional space. In the example of FIG. 9, the k-means clustering algorithm is initialized with an input parameter of k=4, but any number of clusters 906 can be specified, and the clustering algorithm can be run a subsequent time, or run in the alternative, with a different value of k, such as k=2, k=3, and the like. With k=4, the clustering algorithm tries to cluster the n feature vectors into four clusters 906 in an optimal way.

FIG. 9 illustrates initial center estimates 908 that include, for k=4, a first center estimate 908(1), a second center estimate 908(2), and a third center estimate 908(3), and a fourth center estimate 908(4). These center estimates 908 may be estimated to be reasonably close to their final positions at convergence, which can be based on heuristics or empirical data (e.g., data collected from past use, such as test data, of the handheld controller 100 or a test controller). By making reasonably good center estimates 908 to initialize the clustering algorithm, swapping of cluster centers during execution of the cluster analysis algorithm is mitigated. In some embodiments, the center estimates 908 are user-specific based on a known user profile of the handheld controller 100 (e.g., if a user has logged into a user account and has used the handheld controller 100 in the past). In an illustrative example, the first center estimate 908(1) for the first cluster 906(1) may correspond to a group for the middle finger, and may be estimated as a first point in d-dimensional space (e.g., [0, 0, 0, 0.5, 0.5, 0.5]). For instance, the first center estimate 908(1) may be estimated based on a position in d-dimensional space that is correlated with a group of sensors 602 positioned higher on the handle 112 of the controller 100 (e.g., closer to the head of the controller). Meanwhile, the second center estimate 908(2) for the second cluster 906(2) may correspond to a group for the ring finger, and may be estimated as a second point in d-dimensional space (e.g., [0, 0, 0.5, 0.5, 0, 0]). For instance, the second center estimate 908(2) may be estimated based on a position in d-dimensional space that is correlated with a group of sensors 602 positioned near the middle of the handle 112 of the controller 100. Meanwhile, the third center estimate 908(3) for the third cluster 906(3) may correspond to a group for the pinky finger, and may be estimated as a third point in d-dimensional space (e.g., [0, 0, 0, 0, 0.5, 0]). For instance, the third center estimate 908(3) may be estimated based on a position in d-dimensional space that is correlated with a group of sensors 602 that are positioned lower on the handle 112 of the controller 100 (e.g., farther from the head of the controller 100). A fourth center estimate 908(4) for the fourth cluster 906(4) may correspond to a non-finger group, and may be chosen as the origin 902 of the d-dimensional space (e.g., [0, 0, 0, 0, 0, 0]). This fourth center estimate 908(4) is chosen as the origin 902 based on an expectation that a subset of sensors will not be, or will seldom be, touched during use of the handheld controller 100. As long as these center estimates 908 are reasonably accurate (e.g., as long as the center estimates 908 are in the general vicinity of where the cluster center is expected to end up at convergence), the center estimates 908 are sufficient for clustering the feature vectors.

In the process of clustering the feature vectors using a k-means clustering algorithm that has been initialized with input parameters of k clusters 906 and center estimates 908 for those k clusters 906, the logic may iteratively perform an assignment step followed by an update step. For the assignment step, the logic may assign each feature vector to a cluster 906 of the k clusters that has a center estimate 908 that is a smallest distance from the feature vector. For example, each feature vector can be assigned to a cluster 906 whose mean has the least squared Euclidean distance. In the example of FIG. 9, data points including the data point 904(1) are assigned to the cluster 906(1), which has a center estimate 908(1). This is because, for each feature vector assigned to the first cluster 906(1), the distance between the center estimate 908(1) and the feature vector is less than any of the distances between the other center estimates 908(2)-(4) and that feature vector. Said another way, the feature vector represented by the data point 904(1) is determined to be closest to the first center estimate 908(1), among the k center estimates 908, and, therefore, the feature vector represented by the data point 904(1) is assigned to the first cluster 906(1) associated with the first center estimate 908(1). This can be done for each feature vector to assign the feature vectors to clusters as part of the assignment step.

For the update step, the logic may update each center estimate 908 to obtain k updated cluster centers 910, where the center estimate 908 for a cluster 906 is updated based at least in part on the feature vectors assigned to the cluster 906. One way of thinking about this is that the center estimates 908 are moved during the update step to the "middle" of the subset of feature vectors that have been assigned to the corresponding cluster 906. Mathematically, this update step may involve calculating updated means (updated cluster centers 910) of the feature vectors assigned to the cluster 906, and updating the center estimates 908 to those updated cluster centers 910. This is depicted in FIG. 9 by the dashed arrows from the initial center estimates 908 to the updated cluster centers 910 for each cluster 906. For example, the first center estimate 908(1) is "moved" to the first updated cluster center 910(1) during the update step, the second center estimate 908(2) is "moved" to the second updated cluster center 910(2) during the update step, and the third center estimate 908(3) is "moved" to the third updated cluster center 910(3) during the update step. The fourth center estimate 908(4) assigned to the origin 902 may not move during the update step. The assignment step and the update step may iterate until convergence. That is, the logic may repeat the assignment step and the update step until the updated cluster centers 910 converge to final cluster centers (e.g., once the assignments no longer change and once the centers 910 for each cluster 906 cease moving, or move by an amount of zero, or within some threshold of zero).

At convergence, the feature vectors are clustered, and the touch sensor array 600 can be configured according to a controller configuration based at least in part on the clustering. For example, the controller configuration may assign a first subset of sensors 602 that correspond to the feature vectors in the first cluster 906(1) to a first group that corresponds to a first finger of a hand (e.g., a middle finger). The controller configuration may also assign a second subset of sensors 602 that correspond to feature vectors in the second cluster 906(2) to a second group that corresponds to a second finger of the hand (e.g., a ring finger). The controller configuration may also assign a third subset of sensors 602 that correspond to feature vectors in the third cluster 906(2) to a third group that corresponds to a third finger of the hand (e.g., a pinky finger). The controller configuration may also assign a fourth subset of sensors 602 that correspond to feature vectors in the fourth cluster 906(4) to a fourth group that corresponds to a non-finger group (e.g., sensors that are not touched, or are seldom touched).

Figure 10:
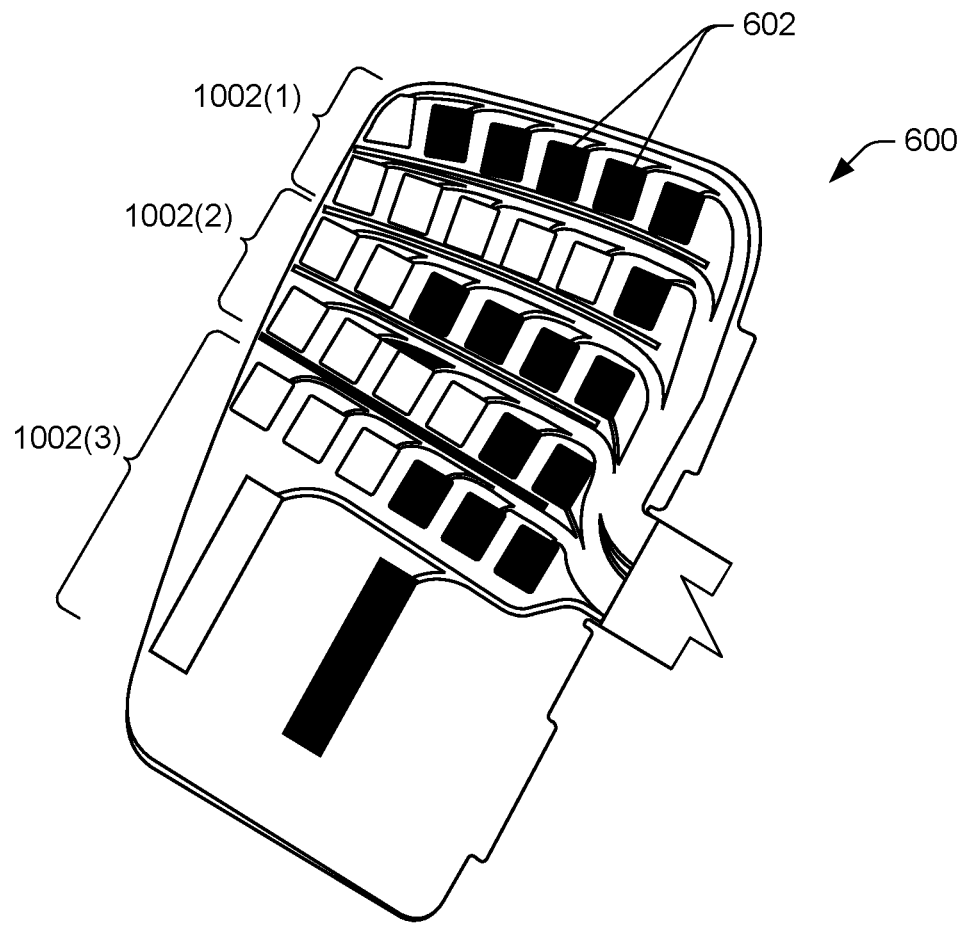
FIG. 10 depicts a controller configuration of the touch sensor of FIG. 6, according to an example embodiment of the present disclosure.

FIG. 10 depicts a controller configuration 1000 of the touch sensor 600 of FIG. 6, according to an example embodiment of the present disclosure. The controller configuration 1000 may have been determined as a result of the cluster-based sensor assignment techniques described herein, where a covariance matrix 800 is generated to derive feature vectors, and a clustering algorithm, such as a k-means clustering algorithm, is used to cluster the feature vectors, the clusters used to assign sensors 602 to groups in accordance with the controller configuration 1000. As shown in FIG. 10, a first subset 1002(1) of sensors 602 denoted by the "shaded-in" sensors 602 within the bracket 1002(1) may be assigned to a first group that corresponds to a first finger of a hand (e.g., a middle finger). A second subset 1002(2) of sensors 602 denoted by the "shaded-in" sensors 602 within the bracket 1002(2) may be assigned to a second group that corresponds to a second finger of a hand (e.g., a ring finger). A third subset 1002(3) of sensors 602 denoted by the "shaded-in" sensors 602 within the bracket 1002(3) may be assigned to a third group that corresponds to a third finger of a hand (e.g., a pinky finger). Comparatively, the sensors 602 that are not shaded-in represent those sensors that are either assigned to a non-finger group, or that are assigned to a finger group, but whose capacitance values are not utilized in generating image data corresponding to the gesture of the hand. However, the sensors 602 not shaded-in may still generate touch sensor data (e.g., by measuring or detecting capacitance values) for the purpose of updating the controller configuration. For instance, if the user's grip changes and starts to touch one or more of the sensors 602 that are not shaded-in, the touch sensor array 600 may be reconfigured based on the cluster analysis to an updated controller configuration that assigns the one or more sensors 602 to a finger group.

Various features can be enabled once sensor assignments have been made. For example, one or more rules can be evaluated once the touch sensor array 600 has been configured according to a controller configuration to validate that the sensor assignments are sensible. For example, logic may determine whether the subsets 1002 of sensors 602 assigned to each group include at least a threshold number of sensors 602, such as at least three sensors 602. If a subset 1002 of sensors 602 includes a number of sensors 602 that do not satisfy the threshold number of sensors 602 (e.g., by being less than the threshold, less than or equal to the threshold, etc.), then the logic may not utilize the data generated by that subset 1002 of sensors 602 by refraining from sending the touch sensor data generated by the sensors 602 in the below-threshold subset 1002 to an application (e.g., a video game) that is configured to receive touch sensor data as input. In other words, data generated by the below-threshold subset 1002 of sensors 602 can be disregarded or ignored for purposes of generating image data associated with a virtual hand (e.g., hand gestures). Additionally, or alternatively, another rule may specify that the sensors 602 assigned to each group are to be contiguous with, or adjacent to, at least one other sensor in the group. In this manner, if a subset 1002 sensors 602 includes a non-adjacent sensor that is not adjacent to any other sensor 602 in the subset 1002, then the logic may not utilize the data generated by that non-adjacent sensor and/or the entire subset 1002 of sensors 602 that includes the non-adjacent sensor.

In some embodiments, the logic may select the N-best sensors 602 (e.g., capacitive pads 602) from each group, and may utilize the touch sensor data generated by the N-best sensors 602 while not utilizing the touch sensor data generated by the remaining sensors that are not included in the selected N-best sensors. For example, in the example controller configuration 1000 of FIG. 10, both the shaded-in and the unshaded sensors 602 within the bracket 1002(1) may have been assigned to a first group that corresponds to a first finger of a hand, and the logic may have selected the "shaded-in" sensors 602 within the bracket 1002(1) as the N-best sensors 602 that are to be utilized for finger tracking, while the unshaded sensors 602 may not be utilized. In one example, because the cluster analysis algorithm outputs cluster centers 910(1), 910(2), and 910(3) that represent points in d-dimensional space that correspond to the "most middle finger point," the "most ring finger point," and the "most pinky finger point," respectively, a predetermined number of the sensors 602 assigned to the "middle finger" group may be selected as the "most representative middle finger pads," based on the distance between those selected sensors' feature vectors and the cluster centers 910 of their corresponding clusters 906. This may be done for the other groups as well (e.g., by selecting a predetermined number of the "most representative ring finger pads," a predetermined number of the "most representative pinky finger pads," etc.), and not utilizing (or disregarding/ignoring data generated by) the remaining pads 602 that are loosely associated with two or more fingers. For example, the logic may utilize three sensors 602 that are described by d-dimensional feature vectors that are closest to the converged cluster center 910(1) of the first cluster 906(1), and may ignore data from (i.e., not utilize) the remaining sensors 602 assigned to a first group associated with the first cluster 906(1). Additionally, or alternatively, instead of selecting the N-best sensors 602 as those with feature vectors that are closest to the converged cluster center 910, the N-best sensors 602 may be chosen as the sensors 602 that are least likely to detect spurious input from an adjacent finger. For instance, the logic may select a predetermined number of sensors 602 in the "middle finger" group that are described by feature vectors farthest away from the converged cluster center 910 of a cluster 906 associated with an adjacent finger group (e.g., the "ring finger" group). That is, the logic may select sensors 602 (e.g., capacitive pads 602) to utilize for tracking the middle finger that are farthest away from the pads 602 that have been assigned to the ring finger, which may avoid spurious input to the middle finger sensors 602.

In some embodiments, the clustering algorithm can be re-run for different number of k clusters. For example, if the clustering algorithm is initialized with k=4 clusters on a first pass, and if there is some indicator that k=4 is suboptimal (e.g., if there is no convergence, if there are too many (e.g., an above-threshold number of) pads 602 assigned to the non-finger group with k=4, etc.), the clustering algorithm can, on a subsequent pass, be initialized with a different value of k, such as k=3, and the clustering algorithm can be re-run. This may be beneficial for users who have lost a finger, and/or users who like to use the handheld controller 100 with some, but not all, of their fingers.

FIGS. 11-14 illustrate various processes as a collection of blocks in a logical flow graph, which represent a sequence of operations that can be implemented in hardware, software, or a combination thereof. In the context of software, the blocks represent computer executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 11:
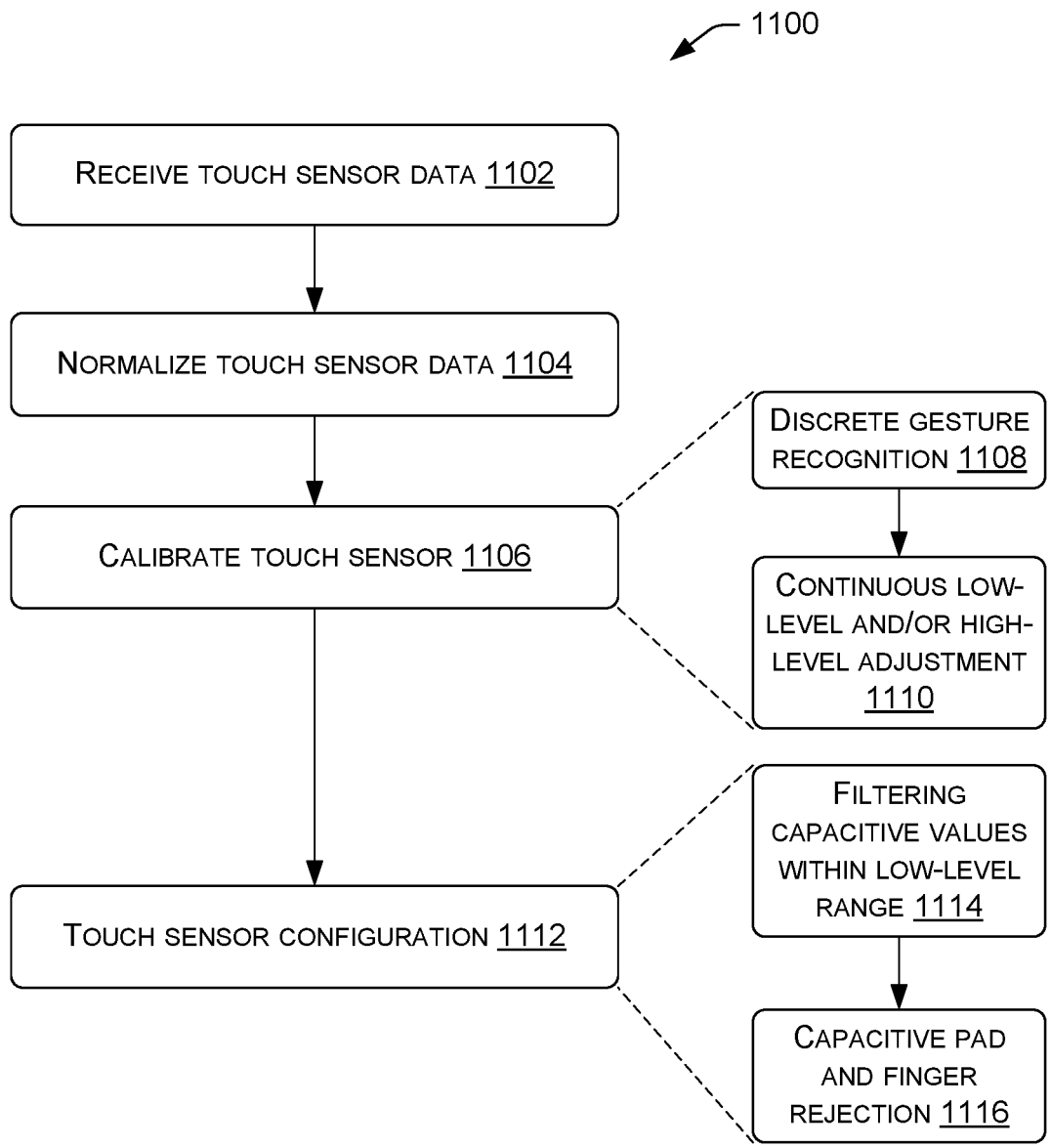
FIGS. 11-14 depict example processes for configuring a touch sensor of a controller according to an example embodiment of the present disclosure.

FIG. 11 is a flow diagram of an example process 1100 for calibrating and configuring a touch sensor 600 for different controller configurations. At 1102, logic of a controller 100 (or a system including the controller 100) may receive touch sensor data from the touch sensor 600. For instance, an object (e.g., finger, thumb, etc.) may contact the controller 100 or come within a proximity of the controller 100 (e.g., above the handle 112). The touch sensor data may indicate a capacitance value detected or measured by the capacitive pads 602 of the touch sensor 600. For instance, if the finger is touching the controller 100, the capacitance value may be larger than compared to a finger that hovers above the controller 100 without touching the controller 100. In this sense, the capacitance value may indicate a proximity of the fingers relative to the controller 100. The logic of the controller 100 may convert the capacitance value into a digitized value.

In some instances, the touch sensor data received at 1102 may represent raw data that is not calibrated and/or normalized with other the touch sensor data provided from other capacitive pads 602. That is, the touch data received at 1102 may represent raw data in the sense that for a particular capacitive pad 602, the capacitive pad 602 may detect capacitance values or a range of capacitance values depending on the size of the capacitive pad 602 and the size of the finger(s) and/or hand of the user touching the controller 100.

At 1104, logic of the controller 100 may normalize the touch sensor data. For instance, through iteratively receiving touch sensor data from the touch sensor 600 (e.g., as a user interacts with the controller 100), the touch sensor data may indicate capacitance values measured by the capacitive pads 602. Over time, the capacitance values may indicate a range of capacitance values detected or measured by the individual capacitive pads 602 of the touch sensor 600. For instance, the capacitive pads 602 may detect a high capacitance value when the user grips a portion of the controller 100 residing above the capacitive pad 602, and may detect a low capacitance value when the user does not grip the portion of the controller 100 residing above the capacitive pad 602. Accordingly, at 1104, for respective capacitive pads 602 of the touch sensor 600, logic of the controller 100 may analyze the touch sensor data and determine the range of capacitance values received, the maximum capacitance value received, the minimum capacitance value received, the average capacitance value, and/or the median capacitance value. In some instances, the capacitance value may be normalized in a range of [0,1].

At 1106, logic of the controller 100 may calibrate the touch sensor 600. As shown by the sub-blocks in FIG. 11, the process 1100 may involve more detailed operations for calibrating the touch sensor 600. For example, calibrating the touch sensor 600 may include sub-blocks 1108 and 1110. As shown by sub-block 1108, calibrating the touch sensor 600 may include a discrete gesture recognition. The discrete gesture recognition may correspond to a discrete gesture performed by the user at the controller 100. For instance, if all or a majority of the capacitance values of the capacitive pads 602 suddenly drop, the logic may associate this drop with the user releasing his or her hand from the controller 100 or releasing a particular finger from the controller 100. The capacitance values received as the user suddenly releases his or her finger from the controller 100 may correspond to a low-level value of a range of capacitance values detected for a particular capacitive pad 602 (e.g., the capacitance value represents when the finger is not touching the controller 100). The capacitance values received prior to the sudden drop may correspond to a high-level value of the range of capacitance values detected for the particular capacitive pad 602 (e.g., the capacitance value represents when the finger is touch the controller 100). With the range of capacitance values, the logic of controller 100 may calculate a bias and a scale factor for capacitance values received by the controller 100. That is, knowing the scale factor for a capacitive pad 602 allows for the normalization of capacitance values received.

As shown by sub-block 1110, calibrating the touch sensor 600 may also include a continuous low-level and/or high-level adjustment. As the logic of the controller 100 continuously receives touch sensor data from the touch sensor 600, the logic may continuously monitor the touch sensor data to re-calibrate the low-level capacitance value and/or the high-level capacitance value for the range of capacitance values of a given capacitive pad 602. For instance, through continuously receiving the touch sensor data from the individual capacitive pads 602, logic of the controller 100 may determine whether the received capacitance values are lower than or higher than the previously determined low-level capacitance value and/or the high-level capacitance value, respectively. Based on this determination, the logic of the controller 100 may update the low-level capacitance value or the high-level capacitance value, thereby adjusting the range of capacitance values for a particular capacitive pad 602. In doing so, the bias and/or scale factor may be updated for use in normalizing the capacitance values. Calibrating the touch sensor 600 may therefore aid in calculating the bias and scale factor for a particular capacitive pad 602 and for a particular user operating the controller 100.

At 1112, the logic of the controller 100 may configure the touch sensor 600, whereby the capacitive pads 602 are assigned to certain fingers of the user based on the cluster analysis, as described herein. In this way, using the cluster-based sensor assignment approach described herein, the controller 100 may map certain capacitive pads 602 and their capacitance values to certain fingers of the user. As shown by the sub-blocks in FIG. 11, the process 1100 may involve more detailed operations to configure the touch sensor 600. For example, configuring the touch sensor 600, in addition to using a clustering algorithm, may involve filtering noise at the low-level range capacitance values, at sub-block 1114, and a capacitive pad and finger rejection, at sub-block 1116, each of which are discussed in turn.

At sub-block 1114, the process 1100 may filter noise within a low-level range of capacitance values. For instance, when a finger is not touching the controller 100 (e.g., hovering above the handle 112 or in close proximity to the handle 112), those capacitive pads 602 associated with the finger may be susceptible to noise. In other words, at the low-level range of capacitance values for a capacitive pad 602, a small amount of measured capacitance may result in changes of the finger position of the user. Generating image data corresponding to these changes may result in unpleasant finger twitching within a VR environment. Instead, in instances where the capacitance values from the touch sensor 600 for individual capacitive pads 602 fall below a certain threshold, are below threshold change from previous capacitance values, or if the capacitance values are within a certain threshold of the low-level capacitance value for the capacitive pad 602, the logic of the controller 100 may suppress the capacitance value. In doing so, the controller 100 may ignore minor spurious touch inputs at the touch sensor 600 that may otherwise result in finger twitching within the VR environment.

The capacitive pad and finger rejection, at sub-block 1116, may include identifying capacitive pads 602 whose low-level capacitance value or high-level capacitance value are within a threshold range of one another. For instance, if the low-level and high-level capacitance values are separated by a small range, the capacitive pad may be unable to accurately sense and detect the finger positions of the user in sufficient detail. Here, as a capacitive pad 602 may detect capacitance values within a threshold range, the measured capacitance values may not accurately correspond to the finger position.

Additionally, or alternatively, certain fingers may be associated with a number of capacitive pads 602 that decreases the reliability of the detected capacitance values. In these scenarios, capacitance values received by the capacitive pads 602 may introduce noise. Disregarding certain capacitive pads 602, or groups of capacitive pads 602, may increase a reliability that the capacitance values correspond to the hand gesture of the user.

While the process 1100 is described being performed by the controller 100, in some instances, the one or more communicatively coupled computing devices may perform all of or a portion of the blocks of the process 1100. For instance, as the one or more computing devices may include increased processing, the controller 100 may transmit the touch data received from touch sensor 600 to the computing device for calibrating and normalizing the capacitance values.

Figure 12:
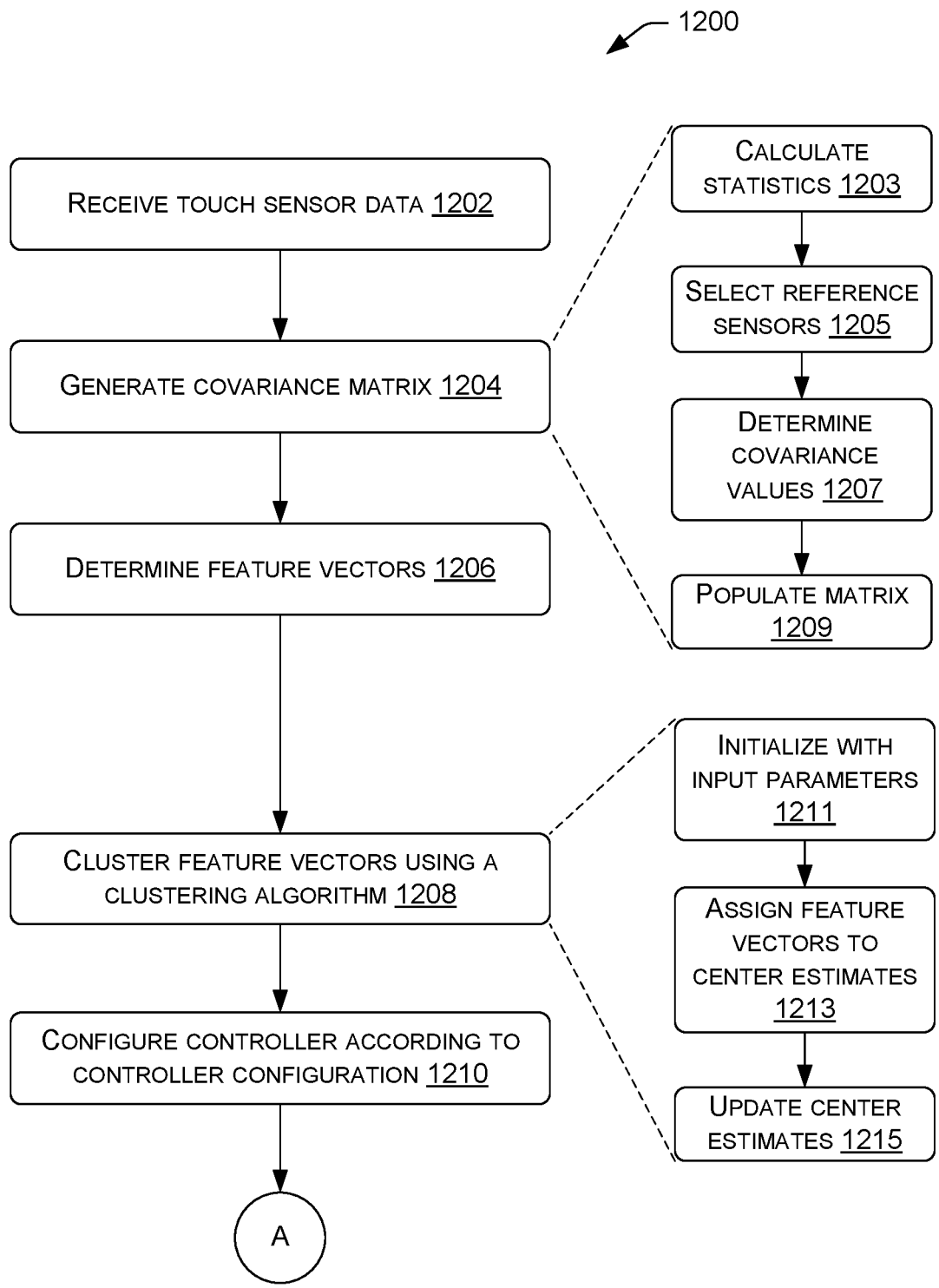

FIG. 12 illustrates an example process 1200 for configuring a controller 100 according to a controller configuration based on cluster analysis. At 1202, logic of a controller 100 (or a system including the controller 100) may receive data generated by the sensors 602 of the touch sensor 600. For instance, an object (e.g., finger, thumb, etc.) may contact the controller 100 or come within a proximity of the controller 100 (e.g., above the handle 112), and the touch sensor 600 may generate data (e.g., capacitance values).

At 1204, based at least in part on the touch sensor data received at block 1202, a covariance matrix 800 may be generated that indicates correlations between pairs of sensors 602 of the plurality of sensors. For example, the covariance matrix 800 may be generated based on a subset of d reference sensors, such as the "shaded-in" sensors shown in FIG. 7, to generate a n×d covariance matrix 800 for a set of n sensors. In some cases, n is a first integer, d is a second integer, and the second integer, d, is less than the first integer, n. By choosing a subset of d reference sensors in this manner, computing resources are conserved and computation is more efficient because not all possible pairs of sensors are evaluated for a positive correlation therebetween. In some embodiments, the subset of d reference sensors used to generate the covariance matrix 800 comprises a column of sensors 602, such as the column of "shaded-in" sensors shown in FIG. 7. As shown by the sub-blocks in FIG. 12, the process 1200 may involve more detailed operations for generating the covariance matrix 800. For example, generating the covariance matrix 800 may include sub-blocks 1203, 1205, 1207, and 1209.

At sub-block 1203, statistics may be calculated based at least in part on the touch sensor data received over the period of time. For example, average capacitance values over the last p samples can be calculated with respect to individual sensors 602 (e.g., capacitive pads).

At sub-block 1205, the subset of d reference sensors 602 may be selected from among the plurality of sensors 602. It is to be appreciated that, in some embodiments, the reference sensors are predetermined, but at sub-block 1205, these reference sensors may be dynamically determined. In some embodiments, this may be based on the user such that different reference sensors are selected for different users.

At sub-block 1207, covariance values between pairs of sensors may be determined based at least in part on the statistics calculated at sub-block 1203. For instance, average capacitance values between pairs of sensors 602 may be compared, and based on a difference between the compared capacitance values, a covariance value may be determined. In some embodiments, these covariance values are determined as values that range from negative one to positive one $[-1,+1]$, or from zero to one $[0,+1]$. At sub-block 1209, the covariance matrix 800 may be populated with the covariance values determined at sub-block 1207.

At 1206, based at least in part on the covariance matrix 800, a plurality of d-dimensional feature vectors are determined. Each feature vector may correspond to a sensor 602 of the plurality of n sensors. Each feature vector may also describe correlations between the sensor 602 and the subset of d reference sensors 602 of the plurality of n sensors.

At 1208, a clustering algorithm may be used to cluster the plurality of d-dimensional feature vectors. For example, a k-means clustering algorithm can be used at block 1208. As shown by the sub-blocks in FIG. 12, the process 1200 may involve more detailed operations for clustering the feature vectors. For example, clustering of the feature vectors may include sub-blocks 1211, 1213, and 1215.

At sub-block 1211, a clustering algorithm, such as a k-means clustering algorithm, may be initialized with input parameters. These input parameters may include, without limitation, a number of k clusters 906 (e.g., k=4), and center estimates 908 for the k clusters 906 in d-dimensional space.

At sub-block 1213, each feature vector of the plurality of feature vectors may be assigned to a cluster 906 of the k clusters that has a center estimate 908 that is a smallest distance from the feature vector. For example, a given feature vector is assigned to a cluster 906 having a center estimate 908 closest to the feature vector, among the k center estimates 908.

At sub-block 1215, each center estimate 908 is updated to obtain k updated cluster centers 910. A center estimate 908 for a cluster 906 is updated based at least in part on the feature vectors assigned the cluster 906. Mathematically, this update step may involve calculating updated means (updated cluster centers 910) of the feature vectors assigned to the cluster 906, and updating the center estimates 908 to those updated cluster centers 910. Sub-blocks 1213 and 1215 may iterate until convergence (e.g., until the updated cluster centers 910 converge to final cluster centers).

At 1210, the touch sensor array 600 of the handheld controller 100 may be configured according to a controller configuration 1000 based at least in part on the clustering of the feature vectors. This configuring operation at block 1210 may result in a controller configuration 1000 that assigns at least a first subset 1002(1) of the plurality of sensors 602 to a first group that corresponds to a first finger of a hand (e.g., a middle finger), and a second subset 1002(2) of the plurality of sensors 602 to a second group that corresponds to a second finger of the hand (e.g., a ring finger). For k=2, these may be the two groups of assigned sensors. For k=3, the controller configuration 1000 may assign a third subset 1002(3) of the plurality of sensors 602 to a third group that corresponds to a third finger of the hand (e.g., a pinky finger). For k=4, he controller configuration 1000 may assign a fourth subset 1002 of the plurality of sensors 602 to a fourth group that corresponds to a non-finger group for untouched, or seldom touched, sensors 602, or a fourth group that corresponds to a fourth finger (e.g., the index finger). While the process 1200 is described being performed by the controller 100, in some instances, the one or more communicatively coupled computing devices may perform all of or a portion of the blocks of the process 1200.

Figure 13:
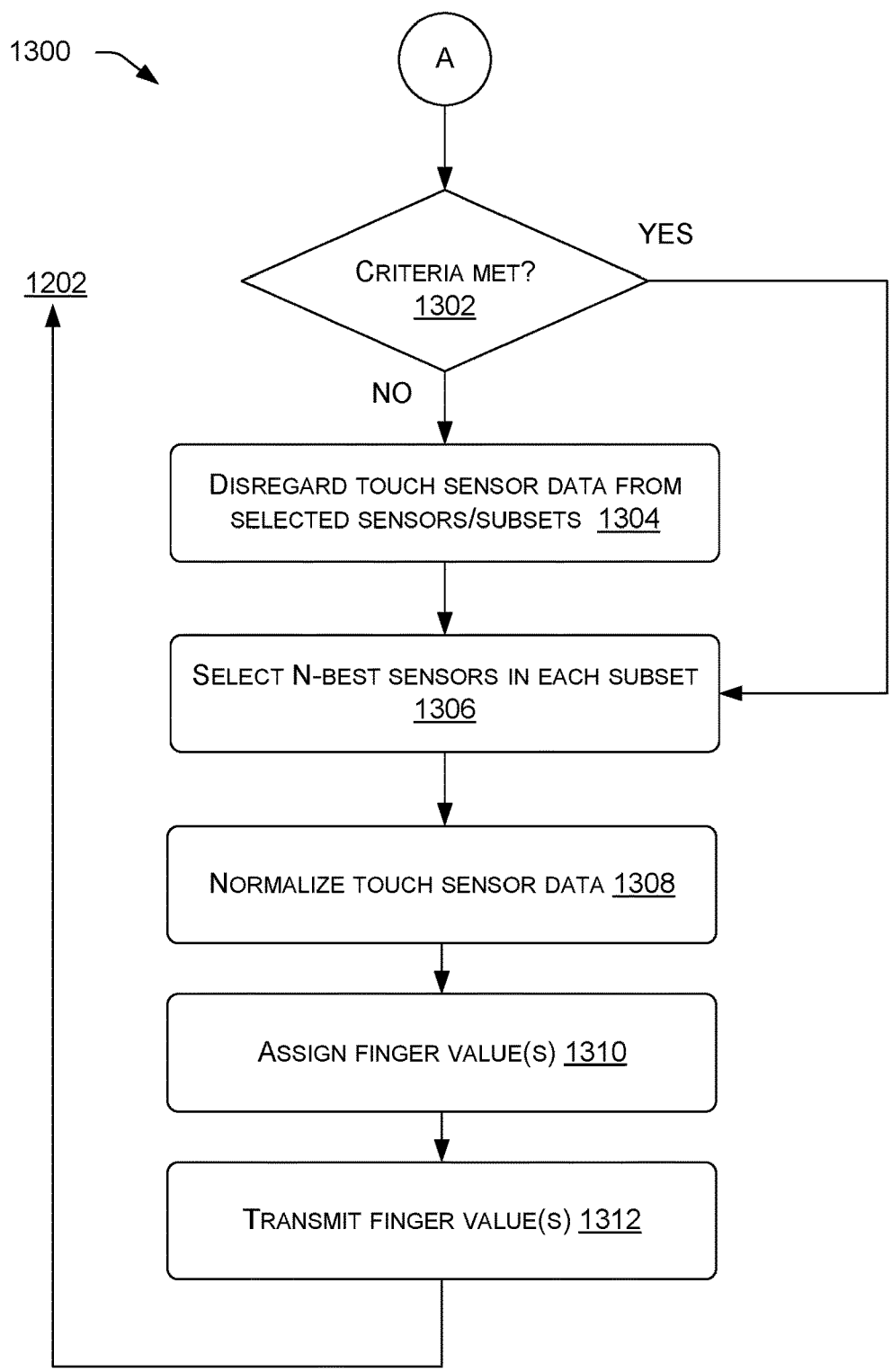

FIG. 13 is a flow diagram of an example process 1300 for selecting certain sensors 602 to utilize after the touch sensor array 600 has been configured according to a controller configuration 1000. In some instances, the process 1300 may continue from "A" of process 1200. At 1302, logic of the controller 100 (or of a system including the controller 100) may determine if a criterion (or criteria) is/are met based at least in part on the controller configuration 1000 of the touch sensor array 600. For example, at 1302, the logic may determine whether any of the subsets 1002 of sensors 602 assigned to a particular group (e.g., a finger group) includes a number of sensors 602 that do not satisfy a threshold number of sensors 602. The threshold may be satisfied if the number of sensors 602 assigned to a particular group meet or exceed the threshold, or if the number of sensors 602 strictly exceeds the threshold. For example, a criterion may be met if each subset includes at least three sensors 602. As another example, at 1302, the logic may determine whether any of the subsets 1002 of sensors 602 assigned to a particular group (e.g., a finger group) includes a non-adjacent sensor that is not adjacent to any other sensor assigned to that particular group (i.e., an isolated sensor within that group). Thus, this example criterion may be met if each sensor 602 in each subset is contiguous with, or adjacent to, at least one other sensor 602 in the group to which that sensor 602 is assigned.

If the criterion (or criteria) is/are not met, the process 1300 may follow the "NO" route from block 1302 to block 1304. For example, if the logic determines that a criterion is not met because at least one subset 1002 of sensors 602 assigned to a group includes a number of sensors that do not satisfy a threshold number of sensors, the logic, at block 1304, may refrain from utilizing the data generated by the sensors in that subset, such as by refraining from sending data generated by the subset of sensors 602 to an application (e.g., a video game) configured to receive touch sensor data as input. As another example, if the logic determines that a criterion is not met because at least one subset 1002 of sensors 602 assigned to a group includes a non-adjacent sensor that is not adjacent to any other sensor 602 in that subset, the logic, at block 1304, may refrain from utilizing data generated by that non-adjacent sensor and/or data generated by the subset of sensors that are assigned to the same group as the non-adjacent sensor. Again, refraining from utilizing the touch sensor data may include refraining from sending the touch sensor data to an application (e.g., a video game) configured to receive touch sensor data as input.

After designating one or more sensors 602, or subsets 1002 of sensors 602, as sensors to ignore at block 1304, or following the "YES" route from block 1302 if the criterion (or criteria) is met, the process 1300 may proceed to block 1306. At 1306, the logic may select the N-best (e.g., a predetermined number of) sensors 602 from individual subsets 1002 of sensors assigned to respective groups, the N-best sensors 602 being those whose touch sensor data is to be utilized (e.g., those sensors 602 that are to be utilized with an application configured to receive data generated by the touch sensor array 600 as input). Ways of selecting the N-best sensors are described herein, such as the N-best sensors with feature vectors closest (in distance) to the cluster center 910 of the corresponding cluster 906 to which those feature vectors are assigned, selecting the N-best sensors with feature vectors farthest (in distance) from a cluster center 910 of an adjacent group (e.g., selecting a predetermined number of middle finger sensors that are described by feature vectors that are farthest from a cluster center 910 of the ring finger cluster 906).

At 1308, with the controller configuration set and the N-best sensors selected in each subset, logic of the controller 100 (or of a system including the controller 100) may normalize the capacitance values of the utilized sensors 602 using a set of weights applied to the individual capacitive pads 602 of a group of capacitive pads 602 associated with a finger. For instance, the weight assigned to individual pads of the capacitive pads 602 may be associated with the controller configuration. For instance, if four capacitive pads 602 of the touch sensor 600 are associated with the middle finger of a user, an equal weight may be assigned to all four capacitive pads 602. Therefore, the capacitance values received from these four capacitive pads 602 may include a weight of one-quarter. In doing so, the capacitance values from these capacitive pads 602 may include an equal weight that is used when determining a finger position. Additionally, in some instances, the weight of a particular capacitive pad 602 may be set to zero based on the capacitive pad and finger rejection indicating which capacitive pads 602 to ignore or have a reliability below a certain threshold.

Normalizing the touch sensor data at 1308 may also involve summing the capacitance values from the capacitive pads 602 for each group of capacitive pads 602. As an example, for a certain controller configuration, if the middle finger is represented by four capacitive pads 602, each capacitance value of the capacitive pad 602 of the middle finger may carry a weight of one-fourth. The logic may weigh the capacitance value for respective capacitive pads 602 for a finger to indicate the influence that the capacitance value for a given capacitive pad 602 has on the summed capacitance values for the finger.

Additionally, or alternatively, normalizing the touch sensor data may include normalizing the touch sensor data according to weights previously applied to the capacitive pads 602. Through the capacitive pad and finger rejection (sub-block 1116), not all capacitive pads 602 within a group of capacitive pads 602 may carry an equal weight. As an example, a user might not contact certain capacitive pads 602 with a group. In turn, the logic may reject or not factor the capacitance value of a particular capacitive pad 602 the user does not touch, for instance, if the hand of the user is small or the user places his or her hands differently on the controller 100. For instance, as noted above, if the low-level capacitance value and high-level capacitance value are narrow (i.e., the range is small), the capacitive pad 602 may be susceptible to high amounts of noise. Here, the logic of the controller 100 may disregard certain capacitance values of a capacitive pad 602 within the weighted sum. In instances were capacitance values are not used, the capacitance values being used may be summed and divided by the sum of the weights being used. For instance, if four capacitive pads 602 are assigned to a particular finger, each capacitive pad 602 may have a weight of one-quarter. However, if the capacitance value for one of the capacitive pads 602 is unreliable (e.g., contains a large amount of noise) the weight of the one capacitive pad 602 may be disregarded such that the remaining three capacitive pads have a weight of one-third. Therein, the capacitive values are summed and divided by the sum of the weights of the capacitive pads 602 being used.

At 1310, the logic of the controller 100 may assign a finger value to respective fingers of the user based at least in part on the touch sensor data. For instance, after normalizing the touch sensor data and associating the touch sensor data with particular fingers, the controller 100 may determine a finger value on a scale of [0,1]. The finger value assigned to fingers of the user may indicate a relative position or curl of the finger relative to the controller 100. In this sense, the controller 100, using the capacitance values detected from individual capacitive pads, may determine the finger positions of the user relative to the controller 100. In some instances, the controller 100 may determine finger values for each finger of the user or those fingers for which the touch sensor 600 is configured.

At 1312, the logic of the controller 100 may transmit the finger values (e.g., indication) to one or more computing devices and/or an application configured to receive touch sensor data as input. In some instances, the one or more computing devices may utilize the finger values to generate image data depicting a gesture of the hand of the user on the controller 100. In some embodiments, the one or more computing devices may perform additional analysis on the finger value. For instance, the one or more computing devices may utilize curl logic when generating a curl of the finger in the image data. Moreover, in some instances, the controller 100 may transmit additional data captured and/or received by the controller 100, such as force data from a pressure sensor of the controller 100 upon a press of the surface by the at least one finger.

From 1312, the process 1300 may loop to step 1202 of the process 1200. Accordingly, the controller 100 may continuously receive capacitance values for use in generating image data according to the grip of the user and for use in dynamically determining/updating the controller configuration of the controller 100 based on cluster analysis, as described herein.

While some or all of the process 1300 is described being performed by the controller 100, in some instances, the one or more communicatively coupled computing device may perform all of or a portion of the blocks of the process 1300. For instance, as the computing device may include increased processing power, the controller may transmit the touch data received from touch sensor 600 to the computing device for determining the cluster-based sensor assignment that is used for determining the controller configuration 1000. In turn, the computing device may transmit the controller configuration 1000 to the controller 100, or transmit an indication of the controller configuration 1000 to the controller 100.

Figure 14:
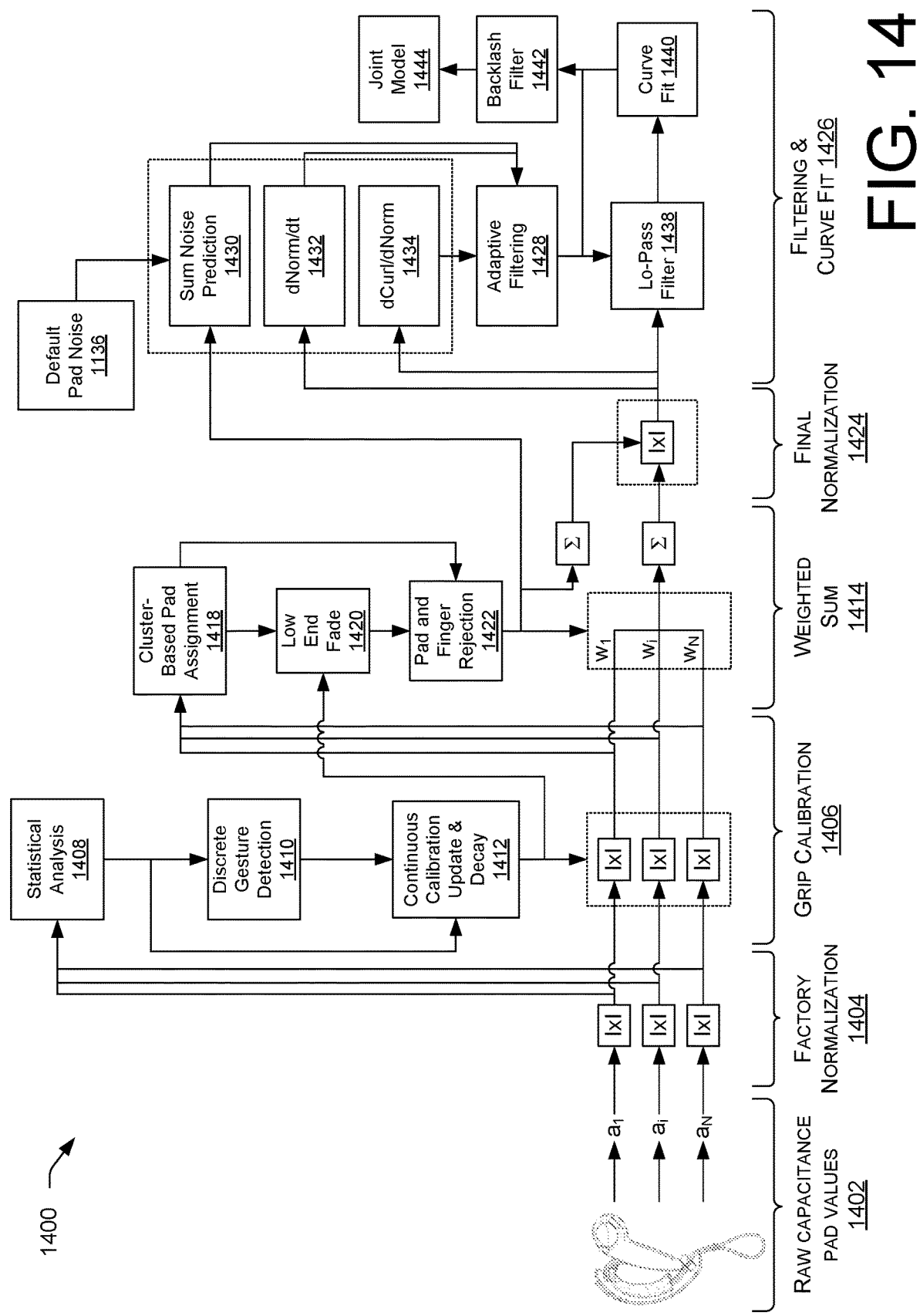

FIG. 14 illustrates a process 1400 for calibrating a touch sensor of a controller, such as the touch sensor 600 of the controller 100, reducing noise within the touch sensor data, and utilizing the touch sensor data to generate image data representative of hand gestures performed by the user. In some instances, the process 1400 may output a finger value or indication representative of a position of the finger, such as how much a finger curls or extends.

At 1402, the process 1400 may receive touch sensor data from the touch sensor 600, where the touch sensor data represents or indicates raw capacitance values detected by capacitive pads (e.g., the capacitive pads 602) of the touch sensor 600. In some instances, the process 1400 may receive capacitance values from individual capacitive pads 602, as illustrated by $a_1$, $a_i$, and $a_N$. In some instances, the process 1400 may receive the raw capacitive values from the touch sensor 600 for each frame displayed in a VR environment.

At 1404, the process 1400 may perform a factory normalization to normalize the raw capacitance values. For instance, the capacitive pads 602 may have different biases, scale factors, and offsets depending on manufacturing conditions, a size of the capacitive pad 602, and so forth. In some instances, the factory normalization may involve a first order calibration to remove the bias within the capacitance value and normalizing the capacitance value.

At 1406, the process 1400 may perform a grip calibration. As shown, the grip calibration may involve sub-blocks 1408, 1410, and 1412, which are discussed in detail in turn.

At sub-block 1408, the process 1400 may perform a statistical analysis to observe a range of capacitance values, the maximum capacitance value received, the minimum capacitance value received, the average capacitance value, and/or the median capacitance value for respective capacitive pads 602.

At 1410, the process 1400 may perform a discrete gesture detection. Here, the process 1400 may analyze the touch sensor data (i.e., the capacitance values), after being normalized according to the factory normalization, to detect a discrete gesture at the controller 100. For instance, if the touch sensor data indicates that capacitance values of the capacitive pads 602, or a portion thereof, suddenly drop, the process 1400 may associate this drop of capacitance values with the user releasing his or her hand from the controller 100 or releasing a particular finger from the controller 100. The capacitance values received as the user suddenly releases his or her finger from the controller 100 may correspond to a low-level value for a range of capacitance values detected by a particular capacitive pad 602 (e.g., where the capacitance value represents when the finger is not touching the controller 100). The capacitance values received prior to the sudden drop may correspond to a high-level value of the range of capacitance values detected by a particular capacitive pad 602 (e.g., where the capacitance value represents when the finger is touching the controller 100). With the range of capacitance values, the process 1400 may determine a bias and a scale factor for capacitance values of the capacitive pads 602 to normalize the capacitance values received at respective capacitive pads 602.

At 1412, the process 1400 may perform a continuous calibration update and decay. As the process 1400 may continuously receive touch sensor data from the touch sensor 600, the process 1400 may continuously monitor the touch sensor data to re-calibrate or reset the low-level capacitance value and/or the high-level capacitance value for the range of capacitance values for a given capacitive pad 602. In other words, through continuously receiving the touch sensor data from the individual capacitive pads 602, the process 1400 may determine whether the capacitance values are lower than or higher than the previously determined low-level capacitance value of the range and/or the high-level capacitance value of the range, respectively. For instance, as the capacitance changes through a gameplay experience (e.g., hands become sweaty or dry, humidity, temperature, etc.), the process 1400 may determine, or set, a new low-level capacitance value or a new high-level capacitance value, thereby adjusting the range of capacitance values detected by a capacitive pad 602. Additionally, in some instances, the continuous calibration may reduce a dependence on the process 1400 determining the discrete gesture detection at 1410.

In some instances, the process 1400 may assign a weight or percentage to a newly detected low-level capacitance value or a newly detected high-level capacitance value to update the low-level capacitance value or high-level capacitance value, respectively. For instance, if the process 1400 detects a capacitance value below a previously detected low-level capacitance value for a certain amount of time, the process 1400 may weigh the capacitance value to update the low-level capacitance value.

Additionally, the low-level capacitance value or high-level capacitance value may decay over time depending on how the user grips the controller 100, environmental conditions (e.g., humidity), or other properties (e.g., skin wetness). The amount the low-level capacitance value and the high-level capacitance value may decay may be limited, such that the low-level capacitance value and the high-level capacitance value are separated by a threshold amount of range to reduce sensor noise. In some instances, the decay may depend on time and/or a rate of change in the capacitance values. For instance, if the user taps their fingers on the controller 100, or the controller 100 switches users, thereby potentially causing a change in the capacitance values received, the rate of decay may increase to reduce an amount of time required to update the low-level and/or the high-level capacitance values.

As a result of the grip calibration at 1406, and the sub-blocks 1408-1412, the capacitive values sensed from each capacitive pad 602 may be normalized on a scale of [0,1]. The scale of [0,1] may represent, for a particular grip of a user and for the individual capacitive pads 602, the high and low levels for the capacitance values sensed from the touch sensor 600.

At 1414, the process 1400 may perform a weighted sum of the capacitive values. As the capacitive values are normalized on the scale of [0,1], the process 1400 may assign a weight to capacitance values from the capacitive pads 602 depending on the controller configuration. That is, the capacitance values are normalized between [0,1] and weights are assigned to individual capacitance values received the individual capacitive pads 602. For instance, if a certain controller configuration includes five capacitive pads 602 assigned to a particular finger, the capacitance values may include an equal weight (e.g., one-fifth). In other words, when the capacitive pads 602 detect a maximum capacitance value, the output of the weighted sum may equal one.

As shown, determining the weighted sum may involve sub-blocks 1418, 1420, and 1422. At sub-block 1418, the process 1400 may perform a dynamic controller configuration determination that is based on cluster analysis, as described herein. For example, the process 1400 may generate a covariance matrix 800 from touch sensor data (e.g., capacitance values) in order to derive feature vectors that are clustered into groups. Based on this clustering, sensors 602 may be assigned to groups that may correspond to fingers of a hand, such as by assigning a first subset of sensors 602 to a first group corresponding to a first finger, a second subset of sensors 602 to a second group corresponding to a second finger, and so on for any suitable number of groups/clusters.

At sub-block 1420, the process 1400 may filter noise contained within the capacitance values. For instance, when a finger is not touching the controller 100, such as when a finger is fully extended, those capacitive pads 602 associated with the finger not touching the controller 100 may be susceptible to noise. Here, detecting a small amount of capacitance may cause a large amount of noise within the received capacitance value. In instances where the capacitance values from the touch sensor 600 for individual capacitive pads 602 fall below a certain threshold, or if the capacitance values are within a certain limit of the low-level capacitance value for the capacitive pads 602, the process 1400 may suppress a detected capacitance. In other instances, in such scenarios, the process 1400 may assign a low weight to the capacitance values.

At sub-block 1422, the process 1400 may reject certain capacitance values from capacitive pads 602 of the touch sensor 600 and/or fingers associated with respective capacitive pads 602. For instance, at 1420 the process 1400 may identify capacitive pads 602 that have a small range between the low-level capacitance value or high-level capacitance value. In these scenarios, capacitance values received by the capacitive pads 602 may introduce noise and disregarding certain capacitive pads 602, or groups of capacitive pads 602, may increase a reliability that the touch sensor data corresponds to the hand gesture of the user. That is, if the range of capacitance values detected by a capacitive pad 602 is small, the capacitive pad 602 may be susceptible to large amounts of noise.

Additionally, or alternatively, certain fingers may be associated with a number of capacitive pads 602 having a low reliability. Rejecting certain fingers, or a group of capacitive pads 602, introduces a contingency behavior for controller configurations for small hand. In these scenarios, a respective finger may associate with adjacent fingers (e.g., pinky finger associates with ring finger). Additionally, or alternatively, as described with respect to FIG. 13, the process 1400 may reject certain touch sensor data if a criterion (or criteria) is not met, such as a subset of sensors 602 assigned to a finger group that has a below-threshold number of sensors assigned to that group (e.g., 2 or fewer sensors assigned to the finger group), and/or a subset of sensors 602 assigned to a finger group that has a non-adjacent (or isolated) sensor that is not contiguous (on the touch sensor array 600) with any other sensors in its assigned group. Additionally, or alternatively, the pad rejection at block 1422 may involve selecting the N-best sensors 602, as described herein, and rejecting touch sensor data from remaining sensors that are not included in the N-best sensors 602.

At 1424, the process 1400 may perform a final normalization. For example, in some instances, a capacitive pad 602 assigned to a particular finger may not detect a capacitance value or the capacitance values may be unreliable. Here, the user may not touch certain capacitive pads 602 of the touch sensor 600 because of the size of the hand or in instances where the user readjusted his or her grip. Additionally, in some instances where the low-level and high-level capacitance values are narrow, or separated by a small range, the capacitance values may be unreliable and noise may significantly impact finger motion. To eliminate or decrease noise from these capacitive pad(s) 602, the final normalization 1424 may determine a reliability of the capacitance values, and if a reliability is low, the weight of a capacitive value from a capacitive pad 602 is removed from the weighted sum. Therein, the capacitive values are summed and divided by the sum of the weights of the capacitive pads 602 being used.

At 1426, the process 1400 may filter and curve fit the touch sensor data to represent a hand gesture of the user. The filtering and curve fitting may involve linearizing the final normalization of the touch data on the [0,1] scale to achieve a linear relationship between the touch sensor data and a position of a finger (e.g., curled, extended, half-way extended, etc.). For instance, the final normalization values determined at 1424 may follow an exponential curve, such that as the hand of the user comes into proximity of the controller 100, or grips the controller 100, the final normalized values exponentially increase. In other words, the summed capacitance value may be exponentially related to the proximity with the finger disposed on/around the controller 100. Linearizing the values on a [0,1] scale such that the capacitance values are correlated with a finger position may reduce sensitivity and an impact that noise may have when a finger is extended from the controller 100, as well as when a finger touches or is in close proximity to the controller 100.

As shown, the filtering and curve fitting may involve various sub-blocks to achieve final values that are utilized to generate hand gestures. At the filtering and curve fit stage 1426, the process 1400 may apply filtering before or after the curve fit. For instance, the sub-blocks may involve filtering capacitance values within the low-level range of capacitance values when the capacitive pads 602 are susceptible to noise. In other words, within the high-level capacitance range, such as when the fingers grip the controller 100 or are in close proximity to the controller 100, the capacitive pads 602 are less susceptible to noise.

The process 1400 may apply adaptive filtering at 1428 to adjust the amount of filtering performed on the capacitance values. The adaptive filtering may adaptively filter to more aggressively filter the capacitance values within the low-range of capacitance values compared to the capacitance values are within the high range of capacitance values. As shown, the adaptive filtering may involve sub-blocks 1430, 1432, and 1434. In general, the adaptive filtering at 1426 may utilize the results of sub-blocks 1430, 1432, and 1434 to determine how much noise exists in the normalized value to determine an amount of filtering to be applied to the normalized capacitance values. Determining an amount of noise that exists in the capacitance values may involve determining which capacitive pads 602 are being used to generate the capacitance values, as well as the high-level and low-level capacitance values for the respective capacitive pads 602. For instance, the capacitive pads 602 may have a baseline noise and if the range between the high-level and low-level capacitance values for a capacitive pad 602 is low, the baseline noise of the capacitive pad 602 may equate to a large amount of finger movement (i.e., baseline noise is a large fraction of the range of capacitance values the capacitive pad 602 is able to sense). Here, the signal to noise ratio may be high. Comparatively, if the range between the high-level and low-level capacitance values for a capacitive pad 602 is large, then the baseline noise of the capacitive pad 602 may not introduce a large amount of finger movement. In these scenarios, to reduce the noise within the capacitance values, when the range of capacitance values is small, the process 1400 may filter capacitance values more heavily than when the range of capacitance values is larger. The filtering and curve fit 1426 may be repeated for each capacitive pad 602 as each capacitive pad 602 may include respective high and low level capacitance values. Additionally, the amount of filtering applied at 1426 may depend on which capacitive pads 602 and/or which capacitive pads 602 have been rejected (e.g., pad and finger rejection 1422).

The sum noise prediction at 1430 may filter the capacitance values based on which capacitive pads 602 are being used, the weights assigned the capacitive pads 602, as well as the respective baseline noise for the capacitive pads 602. For instance, the process 1400 may include a default capacitive pad noise at 1428, which may represent an estimated baseline noise for individual capacitive pads 602. The sum noise prediction step at 1430 may therefore determine, for those capacitive pads 602 being used, their respective baseline noise values. The sum noise prediction step may also determine the expected or predicted noise for the capacitive pads 602. For instance, if the capacitive pads 602 being used sense capacitive values over a large range (i.e., between the low level and high level capacitance values), the capacitance values may include a low amount of noise and less filtering may be applied. However, if the range of capacitance values for a capacitive pad 602 is narrow (i.e., between the low level and high level capacitance values), then the capacitance values may include a large amount of noise and the process 1400 may apply a greater amount of filtering.

The dNorm/dt at 1432 may take into consideration a change in capacitance value over time. For instance, if the received capacitance values from a capacitive pad 602 change significantly over a short period of time (e.g., one frame), the potential noise introduced within the capacitance values may be disregarded or weighted accordingly. That is, instead of filtering the capacitive values and introducing latency, if the capacitance values change over a threshold amount over a threshold amount of time, less filtering may be applied to the capacitive values. In this sense, less filtering may be applied when greater finger movement is detected and more filtering may be applied when less finger movement is detected.

The dCurl/dNorm at 1434 may filter the normalized capacitance value based on an amount of capacitance detected. For instance, in the high-range of capacitance values, where the finger grips the controller, less filtering may be applied because the noise may have less of an impact on finger position. However, at the low range of capacitance values, where the finger is displaced from the controller, or in close proximity, more filtering may be applied because small changes in capacitance values may have a significant impact on the position of the finger. Here, a small change in capacitance values may result in a large change of the finger gesture.

At sub-block 1438, the lo-pass filter may represent a tunable lo-pass mean filter that adjusts the amount of filtering on detected capacitance values. In some instances, the amount of filtering may be on a scale of [0,1] and may be based on the result of the amount of filtering determined at the adaptive filter 1428. That is, the lo-pass filter may filter the capacitance values as determined from the adaptive filtering.

At sub-block 1440, the process 1400 may curve fit the capacitance values on a [0,1] scale to associate the capacitance values with a position of the finger, or a hand animation. For each finger, the output of the curve fit may include a number for each finger, where the number indicates the finger position of each finger of the hand.

At sub-block 1442, the process 1400 may apply a backlash filter after the curve to filter changes in capacitance values that fall below a threshold. For instance, if the capacitance values do not change by a threshold amount on the [0,1] scale, the capacitance values may be filtered. Such filtering may reduce perceived finger twitching and motion by the user.

At sub-block 1444, the joint model may correspond to a hand animation (e.g., a hand skeleton). For instance, the joint model may generate a hand animation corresponding to the number assigned to individual fingers of the hand from the curve fit at 1440.

Figure 15:
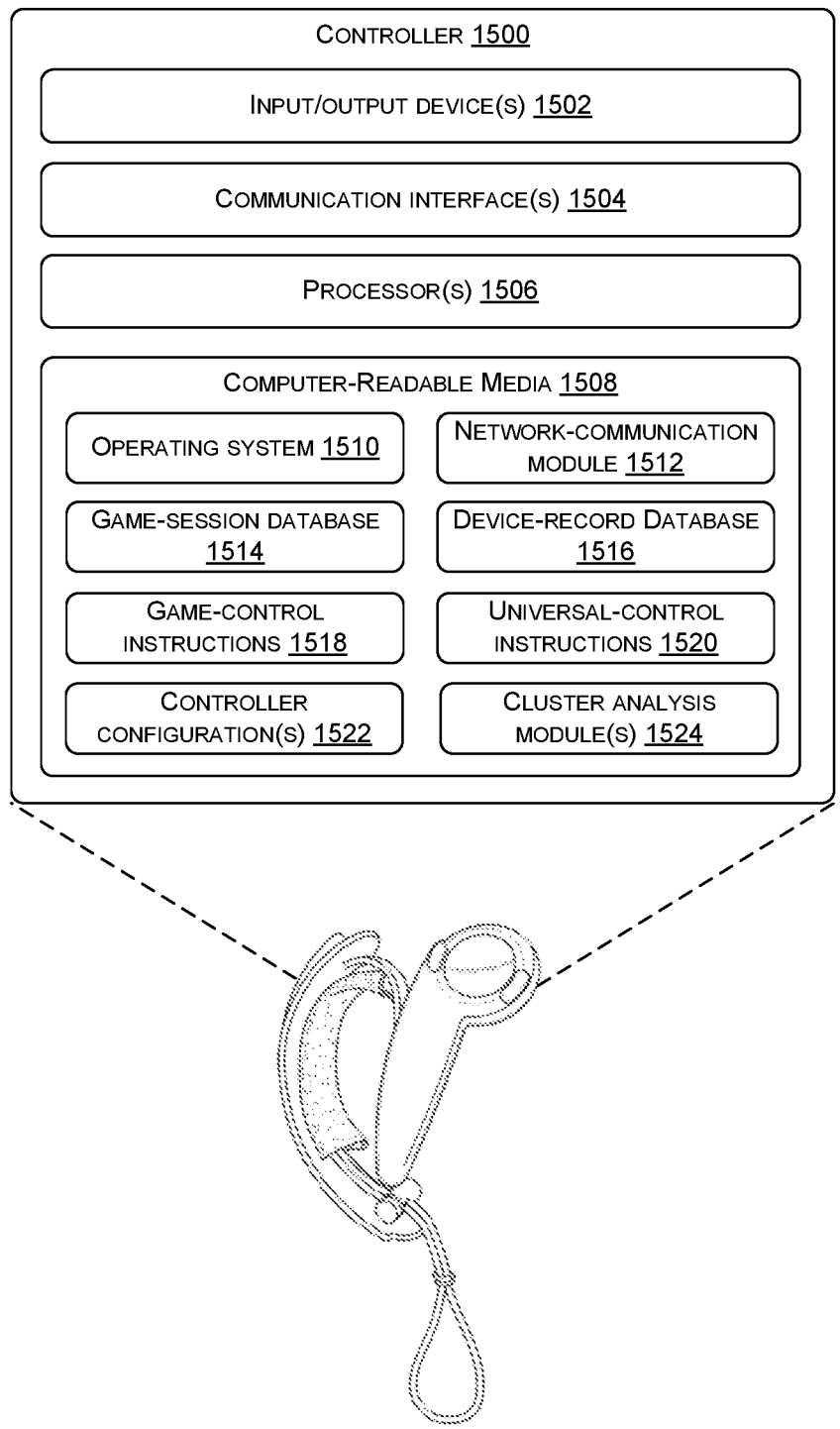
FIG. 15 illustrates example components of the controller of FIG. 1 according to an example embodiment of the present disclosure.

FIG. 15 illustrates example components of a controller 1500, such as the controller 100. In some embodiments, the example components shown in FIG. 15 may be implemented on any computing device that is part of a system including the controller 1500, such as by implementing one or more of the components on a game console or personal computer that is communicatively coupled to the controller 1500. As illustrated, the controller 1500 includes one or more input/output (I/O) devices 1502, such as the controls described above (e.g., joysticks, trackpads, triggers, etc.), and/or potentially any other type of input or output devices. For example, the I/O devices 1502 may include one or more microphones to receive audio input, such as user voice input. In some implementations, one or more cameras or other types of sensors (e.g., inertial measurement unit (IMU)) may function as input devices to receive gestural input, such as motion of the controller 1500. In some embodiments, additional input devices may be provided in the form of a keyboard, keypad, mouse, touch screen, joystick, control buttons and the like. The input device(s) may further include control mechanisms, such as basic volume control button(s) for increasing/decreasing volume, as well as power and reset buttons. The output devices, meanwhile, may include a display, a light element (e.g., LED), a vibrator to create haptic sensations, a speaker(s) (e.g., headphones), and/or the like. There may also be a simple light element (e.g., LED) to indicate a state such as, for example, when the controller 1500 is powered on. While a few examples have been provided, the controller 1500 may additionally or alternatively comprise any other type of output device.

In some instances, output by the one or more output devices may be based on input received by one or more of the input devices. For example, selection of a control touch input at the controller 1500 may result in the output of a haptic response by a vibrator located adjacent (e.g., underneath) the control and/or at any other location. In some instances, the output may vary based at least in part on a characteristic of the touch input on a touch sensor 600, such as the capacitive pads 602 disposed on/within the handle 112 of the controller 100. For example, a touch input at a first location on the handle 112 may result in a first haptic output, while a touch input at a second location on the handle 112 may result in a second haptic output. Furthermore, a particular gesture on the handle 112 may result in a particular haptic output (or other type of output). For instance, a tap and hold gesture (detected by the touch sensor 600) on the handle 112 may result in a first type of haptic output, while a tap and release gesture on the handle 112 may result in a second type of haptic output, while a hard tap of the handle 112 may result in a third type of haptic output.

In addition, the controller 1500 may include one or more communication interfaces 1504 to facilitate a wireless connection to a network and/or to one or more remote systems (e.g., a host computing device executing an application, a game console, other controllers, etc.). The communication interfaces 1504 may implement one or more of various wireless technologies, such as Wi-Fi, Bluetooth, radio frequency (RF), and so on. Additionally, or alternatively, the controller 1500 may include physical ports to facilitate a wired connection to a network, a connected peripheral device, or a plug-in network device that communicates with other wireless networks.

In the illustrated implementation, the controller 1500 further includes one or more processors 1506 and computer-readable media 1508. In some implementations, the processors(s) 1506 may include a central processing unit (CPU), a graphics processing unit (GPU), both CPU and GPU, a microprocessor, a digital signal processor, or other known processing units or components. Additionally, or alternatively, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 1506 may possess its own local memory, which also may store program modules, program data, and/or one or more operating systems.

The computer-readable media 1508 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 1508 may be implemented as computer-readable storage media ("CRSM"), which may be any available physical media accessible by the processor(s) 1506 to execute instructions stored on the computer-readable media 1508. In one implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 1506.

Several modules such as instruction, datastores, and so forth may be stored within the computer-readable media 1508 and configured to execute on the processor(s) 1506. A few example functional modules are shown as stored in the computer-readable media 1508 and executed on the processor(s) 1506, although the same functionality may alternatively be implemented in hardware, firmware, or as a system on a chip (SOC). An operating system module 1510 may be configured to manage hardware within and coupled to the controller 1500 for the benefit of other modules. In addition, the computer-readable media 1508 may store a network-communications module 1512 that enables the controller 1500 to communicate, via one or more of the communication interfaces 1504, with one or more other devices, such as a personal computing device executing an application (e.g., a game application), a game console, a remote server, other controller(s), computing devices, or the like. The computer-readable media 1508 may further include a game-session database 1514 to store data associated with a game (or other application) executing on the controller 1500 or on a computing device coupled to the controller 1500.

The computer-readable media 1508 may also include a device record database 1516 that stores data associated with devices coupled to the controller 1500, such as the personal computing device, game console, remote server, or the like. The computer-readable media 1508 may further store game-control instructions 1518 that configure the controller 1500 to function as a gaming controller, and universal-control instructions 1520 that configure the controller 1500 to function as a controller of other, non-gaming devices. The computer-readable media 1508 may additionally store controller configuration(s) 1522. The controller configuration(s) 1522 may represent or include data associated with the dynamic assignment of the capacitive pads 602 of the touch sensor 600 to associate certain capacitive pads 602 with respective fingers of a user operating the controller 1500 based on cluster analysis, as described herein. A cluster analysis module(s) 1524 may implement the cluster analysis described herein to dynamically determined controller configurations on-the-fly, at runtime, such as by generating the covariance matrix 800, deriving the feature vectors, and clustering the feature vectors to determine a controller configuration 1522.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
    receiving data generated by a plurality of sensors over a period of time, the plurality of sensors distributed on a handle of a handheld controller, and the data indicating a proximity of one or more fingers relative to the handle over the period of time;
    selecting a plurality of reference sensors from the plurality of sensors;
    determining covariance values based at least in part on the data, individual ones of the covariance values indicative of a correlation between a sensor of the plurality of sensors and a sensor of the plurality of reference sensors;
    clustering a plurality of feature vectors, individual ones of the feature vectors including one or more of the covariance values; and
    assigning, based at least in part on the clustering, at least a first subset of the plurality of sensors to a first group that is associated with a first finger of a hand and a second subset of the plurality of sensors to a second group that is associated with a second finger of the hand.

2. The method of claim 1, wherein:
    the plurality of sensors are distributed on the handle in rows of sensors;
    the first subset of the plurality of sensors comprises at least some sensors in one or more first rows of the rows; and
    the second subset of the plurality of sensors comprises at least some sensors in one or more second rows of the rows.

3. The method of claim 1, wherein:
    the first finger is a middle finger;
    the second finger is a ring finger; and
    the assigning further comprises assigning a third subset of the plurality of sensors to a third group that is associated with a pinky finger.

4. The method of claim 3, wherein the assigning further comprises assigning a fourth subset of the plurality of sensors to a non-finger group.

5. The method of claim 1, wherein the clustering of the plurality of feature vectors comprises assigning each feature vector of the plurality of feature vectors to one of a first cluster that is associated with the first group or a second cluster that is associated with the second group.

6. The method of claim 1, further comprising determining the plurality of feature vectors based at least in part on a covariance matrix that includes the covariance values.

7. The method of claim 6, wherein the covariance matrix is a n×d covariance matrix, where n is a number of the plurality of sensors, and where d is less than n.

8. A system comprising:
    a controller having a plurality of sensors spread about a handle of the controller;
    one or more processors; and
    memory storing computer-executable instructions that, when executed by the one or more processors, cause performance of operations comprising:
        receiving data generated by the plurality of sensors over a period of time, the data indicating a proximity of one or more fingers relative to the handle over the period of time;
        selecting a plurality of reference sensors from the plurality of sensors;
        determining covariance values based at least in part on the data, individual ones of the covariance values indicative of a correlation between a sensor of the plurality of sensors and a sensor of the plurality of reference sensors;
        clustering a plurality of feature vectors, individual ones of the feature vectors including one or more of the covariance values; and
        assigning, based at least in part on the clustering, at least a first subset of the plurality of sensors to a first group that is associated with a first finger of a hand and a second subset of the plurality of sensors to a second group that is associated with a second finger of the hand.

9. The system of claim 8, wherein:
the plurality of sensors are spread about the handle in rows of sensors;
the first subset of the plurality of sensors comprises at least some sensors in one or more first rows of the rows; and
the second subset of the plurality of sensors comprises at least some sensors in one or more second rows of the rows.

10. The system of claim 8, wherein:
the first finger is a middle finger;
the second finger is a ring finger; and
the assigning further comprises assigning a third subset of the plurality of sensors to a third group that is associated with a pinky finger.

11. The system of claim 10, wherein the assigning further comprises assigning a fourth subset of the plurality of sensors to a non-finger group.

12. The system of claim 8, wherein the operations further comprise, after the assigning:
receiving additional data generated by the plurality of sensors; and
providing the additional data to an application to render a virtual hand on a display.

13. The system of claim 8, further comprising determining the plurality of feature vectors based at least in part on a covariance matrix that includes the covariance values.

14. One or more non-transitory computer-readable media storing computer-executable instructions that, when executed by one or more processors, cause the one or more processors to perform acts comprising:
receiving data generated by a plurality of sensors over a period of time, the plurality of sensors distributed on a handle of a handheld controller, and the data indicating a proximity of one or more fingers relative to the handle over the period of time;
selecting a plurality of reference sensors from the plurality of sensors;
determining covariance values based at least in part on the data, individual ones of the covariance values indicative of a correlation between a sensor of the plurality of sensors and a sensor of the plurality of reference sensors;
clustering a plurality of feature vectors, individual ones of the feature vectors including one or more of the covariance values; and
assigning, based at least in part on the clustering, at least a first subset of the plurality of sensors to a first group that is associated with a first finger of a hand and a second subset of the plurality of sensors to a second group that is associated with a second finger of the hand.

15. The one or more non-transitory computer-readable media of claim 14, wherein:
the plurality of sensors are distributed on the handle in rows of sensors;
the first subset of the plurality of sensors comprises at least some sensors in one or more first rows of the rows; and
the second subset of the plurality of sensors comprises at least some sensors in one or more second rows of the rows.

16. The one or more non-transitory computer-readable media of claim 14, wherein:
the first finger is a middle finger;
the second finger is a ring finger; and
the assigning further comprises assigning a third subset of the plurality of sensors to a third group that is associated with a pinky finger.

17. The one or more non-transitory computer-readable media of claim 16, wherein the assigning further comprises assigning a fourth subset of the plurality of sensors to a non-finger group.

18. The one or more non-transitory computer-readable media of claim 14, wherein the acts further comprise, after the assigning:
receiving additional data generated by the plurality of sensors; and
providing the additional data to an application to render a virtual hand on a display.

19. The one or more non-transitory computer-readable media of claim 14, wherein the acts further comprise determining the plurality of feature vectors based at least in part on a covariance matrix that includes the covariance values.

20. The one or more non-transitory computer-readable media of claim 14, wherein the acts further comprise:
calculating statistics based at least in part on the data, wherein the determining of the covariance values is based at least in part on the statistics.

* * * * *